(12) United States Patent
Perras et al.

(10) Patent No.: US 9,392,495 B2
(45) Date of Patent: Jul. 12, 2016

(54) METHOD AND APPARATUS FOR INTER-USER DEVICE TRANSFER (IUT) IN A NETWORK BASED MOBILITY DOMAIN

(71) Applicant: INTERDIGITAL PATENT HOLDINGS, INC., Wilmington, DE (US)

(72) Inventors: Michelle Perras, Montreal (CA); Xavier Defoy, Kirkland (CA); Kamel M. Shaheen, King of Prussia, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/194,681

(22) Filed: Mar. 1, 2014

(65) Prior Publication Data
US 2014/0177597 A1    Jun. 26, 2014

Related U.S. Application Data

(63) Continuation of application No. 13/152,595, filed on Jun. 3, 2011, now Pat. No. 8,665,792.

(60) Provisional application No. 61/351,344, filed on Jun. 4, 2010, provisional application No. 61/475,389, filed on Apr. 14, 2011.

(51) Int. Cl.
| | |
|---|---|
| *H04W 36/00* | (2009.01) |
| *H04W 76/02* | (2009.01) |
| *H04W 80/04* | (2009.01) |
| *H04L 29/06* | (2006.01) |

(52) U.S. Cl.
CPC ....... *H04W 36/0022* (2013.01); *H04L 65/1083* (2013.01); *H04L 65/1093* (2013.01); *H04W 76/022* (2013.01); *H04W 80/04* (2013.01); *H04L 65/1096* (2013.01)

(58) Field of Classification Search
None
See application file for complete search history.

(56) References Cited

U.S. PATENT DOCUMENTS

| 7,936,761 | B2 | 5/2011 | Takeda | |
|---|---|---|---|---|
| 8,036,189 | B2 | 10/2011 | Hirano et al. | |
| 8,050,229 | B2 | 11/2011 | Miao et al. | |
| 8,599,843 | B2 * | 12/2013 | Sarikaya | 370/389 |
| 8,681,739 | B1 * | 3/2014 | Zhao et al. | 370/331 |
| 2003/0086390 | A1 | 5/2003 | Eschbach et al. | |

(Continued)

FOREIGN PATENT DOCUMENTS

| CN | 101369966 A | 2/2009 |
|---|---|---|
| EP | 1465039 A1 | 10/2004 |

(Continued)

OTHER PUBLICATIONS

Gundavelli et al., "Proxy Mobile IPv6," Network Working Group, Request for Comments: 5213 (Aug. 2008).

(Continued)

*Primary Examiner* — Hong Cho
(74) *Attorney, Agent, or Firm* — Condo Roccia Koptiw LLP

(57) ABSTRACT

A method and apparatus for performing Inter-User Equipment Transfer (IUT) across any internet protocol (IP) based network. This framework allows for preparation, execution and completion of data transfer at a target device through registration with a Local Mobility Anchor (LMA) and receipt of an IUT request. The target device receives and stores an IP address or a source device. The IP address is used to transmit session information.

8 Claims, 24 Drawing Sheets

(56) References Cited

U.S. PATENT DOCUMENTS

| | | | |
|---|---|---|---|
| 2004/0105413 | A1 | 6/2004 | Menon |
| 2007/0165561 | A1 | 7/2007 | Veerepalli |
| 2009/0016301 | A1 | 1/2009 | Sammour |
| 2009/0031130 | A1 | 1/2009 | Hirano et al. |
| 2009/0245149 | A1* | 10/2009 | Xia et al. ............... 370/310 |
| 2010/0037085 | A1* | 2/2010 | Qiang ......................... 714/2 |
| 2010/0146142 | A1 | 6/2010 | Long et al. |
| 2010/0154033 | A1 | 6/2010 | Oulai |
| 2010/0322106 | A1* | 12/2010 | Qiang ....................... 370/254 |

FOREIGN PATENT DOCUMENTS

| | | |
|---|---|---|
| EP | 1578162 A1 | 9/2005 |
| TW | I224909 B | 12/2004 |
| TW | I259007 B | 7/2006 |
| TW | I280809 B | 5/2007 |
| TW | M355523 U | 4/2009 |
| WO | WO-2010055436 A1 | 5/2010 |

OTHER PUBLICATIONS

Interdigital Communications, "MIP based Inter-UE-Transfer mechanism," 3GPP TSG SA WG2 Meeting #80, S2-103543 (Aug. 30-Sep. 3, 2010).

Johnson et al., "Mobility Support in IPv6," Network Working Group, Request for Comments: 3775 (Jun. 2004).

Soliman et al., "Flow Bindings in Mobile IPv6 and NEMO Basic Support," IETF MEXT Working Group, Internet-Draft (Mar. 1, 2010).

Soliman, "Mobile IPv6 Support for Dual Stack Hosts and Routers," Network Working Group, Request for Comments: 5555 (Jun. 2009).

Third Generation Partnership Project, "Technical Specification Group Services and System Aspects; Architecture enhancements for non-3GPP accesses (Release 9)," 3GPP TS 23.402 V9.4.0 (Mar. 2010).

Third Generation Partnership Project, "Technical Specification Group Services and System Aspects; Architecture enhancements for non-3GPP accesses (Release 9)," 3GPP TS 23.402 V9.8.0 (Mar. 2011).

Third Generation Partnership Project, "Technical Specification Group Services and System Aspects; Architecture enhancements for non-3GPP accesses (Release 8)," 3GPP TS 23.402 V8.8.0 (Dec. 2009).

Third Generation Partnership Project, "Technical Specification Group Services and System Aspects; Architecture enhancements for non-3GPP accesses (Release 10)," 3GPP TS 23.402 V10.3.0 (Mar. 2011).

Third Generation Partnership Project, "Technical Specification Group Services and System Aspects; Architecture enhancements for non-3GPP accesses (Release 8)," 3GPP TS 23.402 V8.9.0 (Jun. 2010).

Third Generation Partnership Project, "Technical Specification Group Services and System Aspects; Multi access PDN connectivity and IP flow mobility (Release 9)," 3GPP TR 23.861 V1.3.0 (Sep. 2009).

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.13.0 (Mar. 2011).

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.9.0 (Mar. 2010).

Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.4.0 (Mar. 2010).

Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.3.0 (Mar. 2011).

Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.8.0 (Mar. 2011).

Third Generation Partnership Project, "Technical Specification Group Services and System Aspects; IP Flow Mobility and seamless WLAN offload; Stage 2 (Release 10)," 3GPP TS 23.261 V1.1.0 (May 2010).

Third Generation Partnership Project, "Technical Specification Group Services and System Aspects; IP flow mobility and seamless Wireless Local Area Network (WLAN) offload; Stage 2 (Release 10)," 3GPP TS 23.261 V10.1.0 (Sep. 2010).

Third Generation Partnership Project, "Technical Specification Group Services and System Aspects; IP Multimedia Subsystem (IMS) Service Continuity; Stage 2 (Release 8)," 3GPP TS 23.237 V8.7.0 (Mar. 2010).

Third Generation Partnership Project, "Technical Specification Group Services and System Aspects; IP Multimedia Subsystem (IMS) Service Continuity; Stage 2 (Release 9)," 3GPP TS 23.237 V9.8.0 (Mar. 2011).

Third Generation Partnership Project, "Technical Specification Group Services and System Aspects; IP Multimedia Subsystem (IMS) Service Continuity; Stage 2 (Release 9)," 3GPP TS 23.237 V9.4.0 (Mar. 2010).

Third Generation Partnership Project, "Technical Specification Group Services and System Aspects; IP Multimedia Subsystem (IMS) Service Continuity; Stage 2 (Release 10)," 3GPP TS 23.237 V10.5.0 (Mar. 2011).

Third Generation Partnership Project, "Technical Specification Group Services and System Aspects; IP Multimedia Subsystem (IMS) Service Continuity; Stage 2 (Release 11)," 3GPP TS 23.237 V11.0.0 (Mar. 2011).

Third Generation Partnership Project, "Technical Specification Group Services and System Aspects; IP Multimedia Subsystem (IMS) Service Continuity; Stage 2 (Release 10)," 3GPP TS 23.237 V10.1.0 (Mar. 2010).

Third Generation Partnership Project, "Technical Specification Group Services and System Aspects; Location Services (LCS) architecture for 3GPP system—Wireless Local Area Network (WLAN) interworking (Release 7)," 3GPP TR 23.837 V1.0.0 (Sep. 2006).

Third Generation Partnership Project, "Technical Specification Group Services and System Aspects; LCS Architecture for 3GPP Interworking WLAN; Release 7," 3GPP TR 23.837 V0.3.0 (Jun. 2006).

Third Generation Partnership Project, "Technical Specification Group Core Network and Terminals; IP Multimedia (IM) Core Network (CN) subsystem IP Multimedia Subsystem (IMS) Service Continuity; Stage 3 (Release 10)," 3GPP TS 24.237 V10.0.0 (Sep. 2010).

Third Generation Partnership Project, "Technical Specification Group Core Network and Terminals; IP Multimedia (IM) Core Network (CN) subsystem IP Multimedia Subsystem (IMS) Service Continuity; Stage 3 (Release 9)," 3GPP TS 24.237 V9.6.0 (Mar. 2011).

Third Generation Partnership Project, "Technical Specification Group Core Network and Terminals; IP Multimedia (IM) Core Network (CN) subsystem IP Multimedia Subsystem (IMS) Service Continuity; Stage 3 (Release 8)," 3GPP TS 24.237 V8.8.0 (Mar. 2011).

Third Generation Partnership Project, "Technical Specification Group Core Network and Terminals; IP Multimedia (IM) Core Network (CN) subsystem IP Multimedia Subsystem (IMS) Service Continuity; Stage 3 (Release 9)," 3GPP TS 24.237 V9.2.0 (Mar. 2010).

Third Generation Partnership Project, "Technical Specification Group Core Network and Terminals; IP Multimedia (IM) Core Network (CN) subsystem IP Multimedia Subsystem (IMS) Service Continuity; Stage 3 (Release 8)," 3GPP TS 24.237 V8.5.0 (Mar. 2010).

Third Generation Partnership Project, "Technical Specification Group Core Network and Terminals; IP Multimedia (IM) Core Net-

(56) References Cited

OTHER PUBLICATIONS work (CN) subsystem IP Multimedia Subsystem (IMS) Service Continuity; Stage 3 (Release 10)," 3GPP TS 24.237 V10.2.0 (Mar. 2011).
Third Generation Partnership Project, "Technical Specification Group Core Network and Terminals; General Packet Radio Service (GPRS); GPRS Tunnelling Protocol (GTP) across the Gn and Gp interface (Release 10)," 3GPP TS 29.060 V10.1.0 (Mar. 2011).
Third Generation Partnership Project, "Technical Specification Group Core Network and Terminals; General Packet Radio Service (GPRS); GPRS Tunnelling Protocol (GTP) across the Gn and Gp interface (Release 9)," 3GPP TS 29.060 V9.6.0 (Mar. 2011).
Third Generation Partnership Project, "Technical Specification Group Core Network and Terminals; General Packet Radio Service (GPRS); GPRS Tunnelling Protocol (GTP) across the Gn and Gp interface (Release 8)," 3GPP TS 29.060 V8.11.0 (Mar. 2010).
Third Generation Partnership Project, "Technical Specification Group Core Network and Terminals; General Packet Radio Service (GPRS); GPRS Tunnelling Protocol (GTP) across the Gn and Gp interface (Release 9)," 3GPP TS 29.060 V9.2.0 (Mar. 2010).
Third Generation Partnership Project, "Technical Specification Group Core Network and Terminals; General Packet Radio Service (GPRS); GPRS Tunnelling Protocol (GTP) across the Gn and Gp interface (Release 8)," 3GPP TS 29.060 V8.13.1 (Jan. 2011).
Third Generation Partnership Project, "Technical Specification Group Services and System Aspects; Telecommunication management; Charging management; Charging Data Record (CDR) transfer (Release 10)," 3GPP TS 32.295 V10.0.0 (Mar. 2010).
Third Generation Partnership Project, "Technical Specification Group Service and System Aspects; Telecommunication management; Charging management; Charging Data Record (CDR) transfer; (Release 9)," 3GPP TS 32.295 V9.0.0 (Dec. 2009).
Third Generation Partnership Project, "Technical Specification Group Services and System Aspects; IP Multimedia Subsystem (IMS) based Packet Switch Streaming (PSS) and Multimedia Broadcast/Multicast Service (MBMS) User Service; Protocols (Release 10)," 3GPP TS 26.237 V10.1.0 (Mar. 2011).
Third Generation Partnership Project, "Technical Specification Group Services and System Aspects; IP Multimedia Subsystem (IMS) based Packet Switch Streaming (PSS) and Multimedia Broadcast/Multicast Service (MBMS) User Service; Protocols (Release 10)," 3GPP TS 26.237 V10.1.0 (Sep. 2010).
Third Generation Partnership Project, "Technical Specification Group Services and System Aspects; IP Multimedia Subsystem (IMS) based Packet Switch Streaming (PSS) and Multimedia Broadcast/Multicast Service (MBMS) User Service; Protocols (Release 9)," 3GPP TS 26.237 V9.5.0 (Mar. 2011).
Third Generation Partnership Project, "Technical Specification Group Services and System Aspects; IP Multimedia Subsystem (IMS) based Packet Switch Streaming (PSS) and Multimedia Broadcast/Multicast Service (MBMS) User Service; Protocols (Release 8)," 3GPP TS 26.237 V8.5.0 (Sep. 2010).
Third Generation Partnership Project, "Technical Specification Group Services and System Aspects; IP Multimedia Subsystem (IMS) based Packet Switch Streaming (PSS) and Multimedia Broadcast/Multicast Service (MBMS) User Service; Protocols (Release 9)," 3GPP TS 26.237 V9.2.0 (Mar. 2010).
Third Generation Partnership Project, "Technical Specification Group Services and System Aspects; IP Multimedia Subsystem (IMS) based Packet Switch Streaming (PSS) and Multimedia Broadcast/Multicast Service (MBMS) User Service; Protocols (Release 8)," 3GPP TS 26.237 V8.4.0 (Dec. 2009).
Third Generation Partnership Project, "Technical Specification Group Core Network and Terminals; General Packet Radio System (GPRS) Tunnelling Protcol User Plane (GTPv1-U) (Release 9)," 3GPP TS 29.281 V9.2.0 (Mar. 2010).
Third Generation Partnership Project, "Technical Specification Group Core Network and Terminals; General Packet Radio System (GPRS) Tunnelling Protcol User Plane (GTPv1-U) (Release 8)," 3GPP TS 29.281 V8.5.0 (Mar. 2010).
Third Generation Partnership Project, "Technical Specification Group Core Network and Terminals; General Packet Radio System (GPRS) Tunnelling Protcol User Plane (GTPv1-U) (Release 9)," 3GPP TS 29.281 V9.3.0 (Jun. 2010).
Third Generation Partnership Project, "Technical Specification Group Core Network and Terminals; General Packet Radio System (GPRS) Tunnelling Protcol User Plane (GTPv1-U) (Release 10)," 3GPP TS 29.281 V10.1.0 (Mar. 2011).
Third Generation Partnership Project, "Technical Specification Group Core Network and Terminals; General Packet Radio System (GPRS) Tunnelling Protcol User Plane (GTPv1-U) (Release 10)," 3GPP TS 29.281 V10.0.0 (Dec. 2010).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 9)," 3GPP TS 29.274 V9.6.0 (Mar. 2011).
Third Generation Partnership Project, "Technical Specification Group Core Network and Terminals; 3GPP Evolved Pacted System (EPS); Evolved General Packet Radio Service (GPRS) Tunnelling Protocol for Control plane (GTPv2-C); Stage 3 (Release 10)," 3GPP TS 29.274 V10.2.0 (Mar. 2011).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 8),"3GPP TS 29.274 V8.5.0 (Mar. 2010).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 8),"3GPP TS 29.274 V8.9.0 (Mar. 2011).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 10),"3GPP TS 29.274 V10.0.0 (Sep. 2010).
Third Generation Partnership Project, "Technical Specification Group Core Network and Terminals; 3GPP Evolved Packet System (EPS); Evolved General Packet Radio Service (GPRS) Tunnelling Protocol for Control plane (GTPv2-C); Stage 3 (Release 9),"3GPP TS 29.274 V9.2.0 (Mar. 2010).
Third Generation Partnership Project, "Technical Specification Group Services and System Aspects; IP Multimedia Subsystem (IMS) Service Continuity; Inter-UE Transfer enhancements; Stage 2 (Release 10)," 3GPP TR 23.831 V10.0.0 (Sep. 2010).
Third Generation Partnership Project, "Technical Specification Group Services and System Aspects; IP Multimedia Subsystem (IMS) Service Continuity; Inter-UE Transfer enhancements; Stage 2 (Release 10)," 3GPP TR 23.831 V0.4.0 (May 2010).
Wakikawa et al., "Multiple Care-of Addresses Registration," Network Working Group, Request for Comments: 5648 (Oct. 2009).
Xia, "Flow Binding in Proxy Mobile IPv6," Network Working Group, Internet Draft (Feb. 18, 2009).
3rd Generation Partnership Project (3GPP), TD S2-087748, "Inter UE service control and media flow transfer scenarios", Starent Networks, 3GPP TSG SA WG2 Meeting #69, Miami, Florida, United States, Nov. 17-21, 2008, 2 pages.
3rd Generation Partnership Project (3GPP), TD S2-087749, "Inter UE media flow transfer", Starent Networks, 3GPP TSG SA WG2 Meeting #68, Miami, Florida, United States, Nov. 17-21, 2008, 3 pages.
3rd Generation Partnership Project (3GPP), "Technical Specification Group Services and System Aspects; IP Multimedia Subsystem (IMS) Service Continuity; Inter-UE Transfer enhancements; Stage 2 (Release 10)," 3GPP TR 23.831 V0.3.0 (Mar. 2010).

\* cited by examiner

METHOD AND APPARATUS FOR INTER-USER DEVICE TRANSFER (IUT) IN A NETWORK BASED MOBILITY DOMAIN

CROSS REFERENCE TO RELATED APPLICATIONS

This application is a continuation of U.S. patent application Ser. No. 13/152,595 filed on Jun. 3, 2011 and claims the benefit of U.S. Provisional Application Ser. No. 61/351,344 filed on Jun. 4, 2010 and U.S. Provisional Application Ser. No. 61/475,389 filed on Apr. 14, 2011, the contents of which are hereby incorporated by reference herein.

BACKGROUND

The Internet Protocol (IP) Multimedia Subsystem (IMS) is an architectural framework for delivering IP-based multimedia services. A wireless transmit/receive unit (WTRU) may connect to an IMS through various access networks, including but not limited to networks based on technology such as Universal Mobile Telecommunication System (UMTS) Terrestrial Radio Access Network (UTRAN), Long Term Evolution (LTE), Worldwide Interoperability for Microwave Access (WiMax), or Wireless Local Area Network (WLAN) technology. Some procedures available through the use of IMS are the transfer, modification, replication and retrieval of media sessions between IMS-capable WTRUs in real-time. These procedures are known as Inter-User Equipment Transfer (IUT). However, IMS IUT is tightly bound to the IMS infrastructure and requires IMS-capable WTRUs. Accordingly, it would be advantageous for a media mobility framework that performs IUT for non-IMS capable WTRUs across any Internet protocol (IP) based network.

SUMMARY

A method and apparatus for performing Inter-User Equipment Transfer (IUT) across an internet protocol (IP) based network using a proxy mobile internet protocol (PMIP) or a general packet radio service (GPRS) tunneling protocol (GTP). This framework allows for preparation, execution and completion of data transfer at a target device through registration with a Local Mobility Anchor (LMA), receipt of an IUT request and creation of a dedicated bearer. The target device is associated with the dedicated bearer and receives session information based on its association with the dedicated bearer.

BRIEF DESCRIPTION OF THE DRAWINGS

A more detailed understanding may be had from the following description, given by way of example in conjunction with the accompanying drawings wherein.

DETAILED DESCRIPTION

Figure 1A:
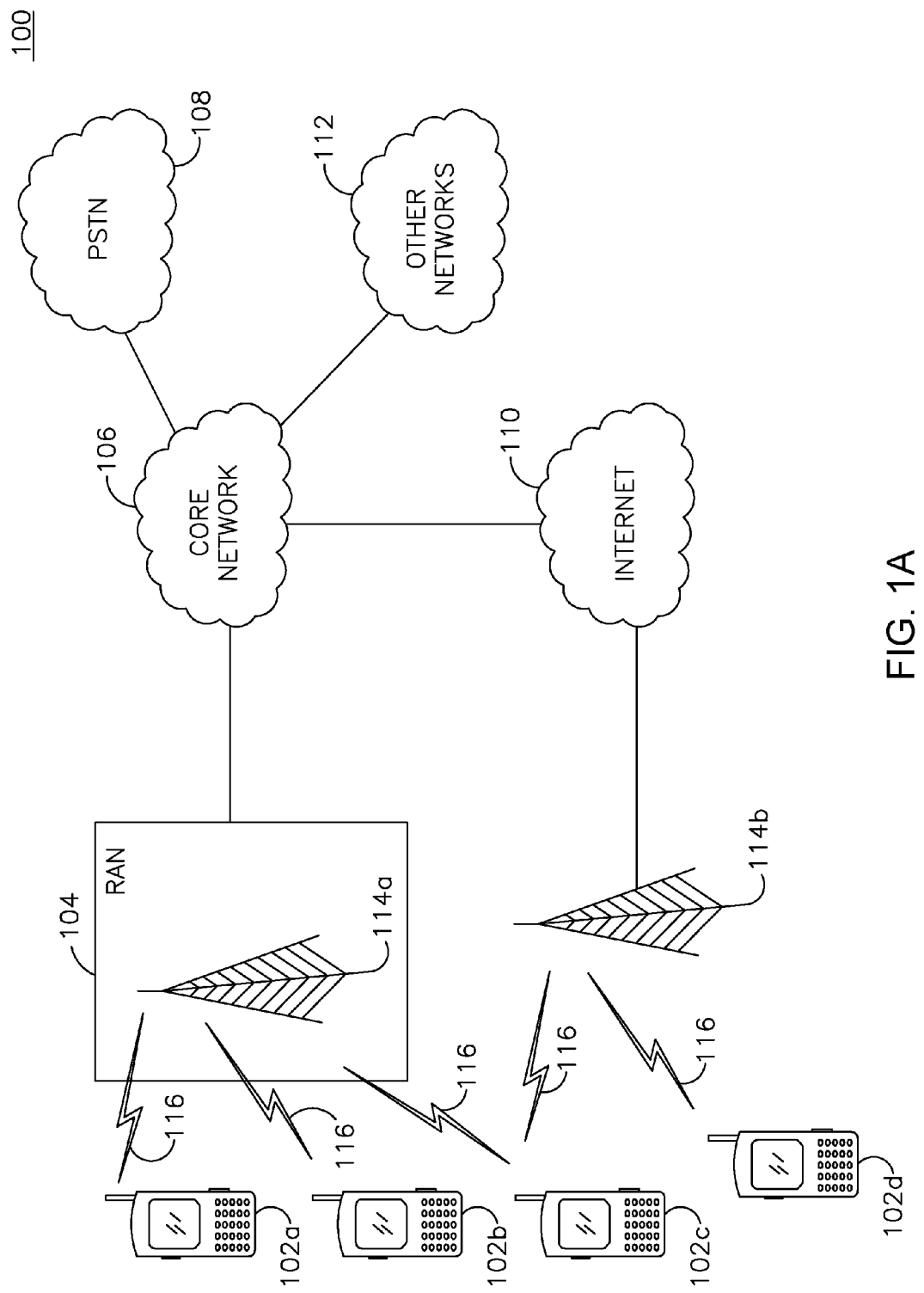
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
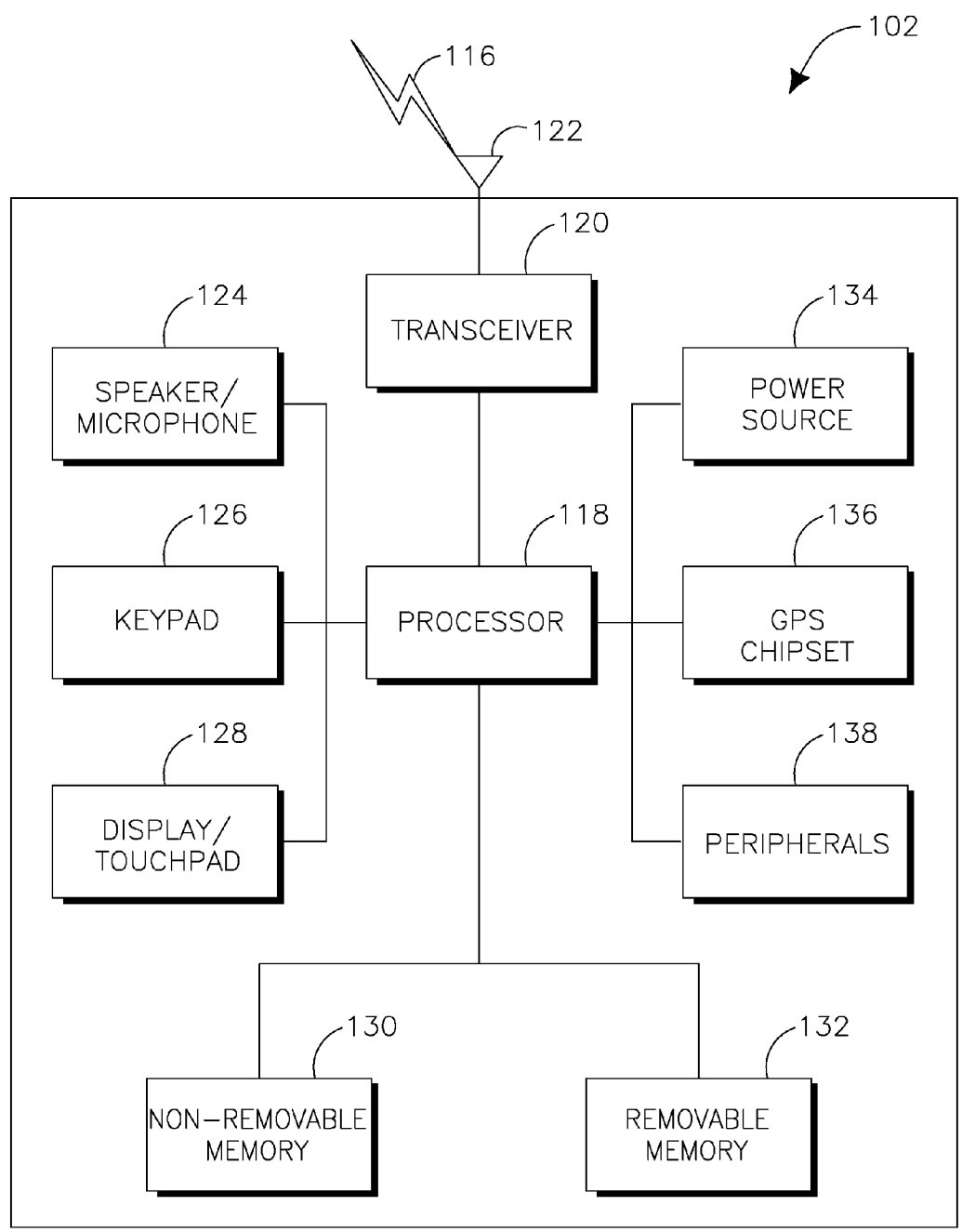
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
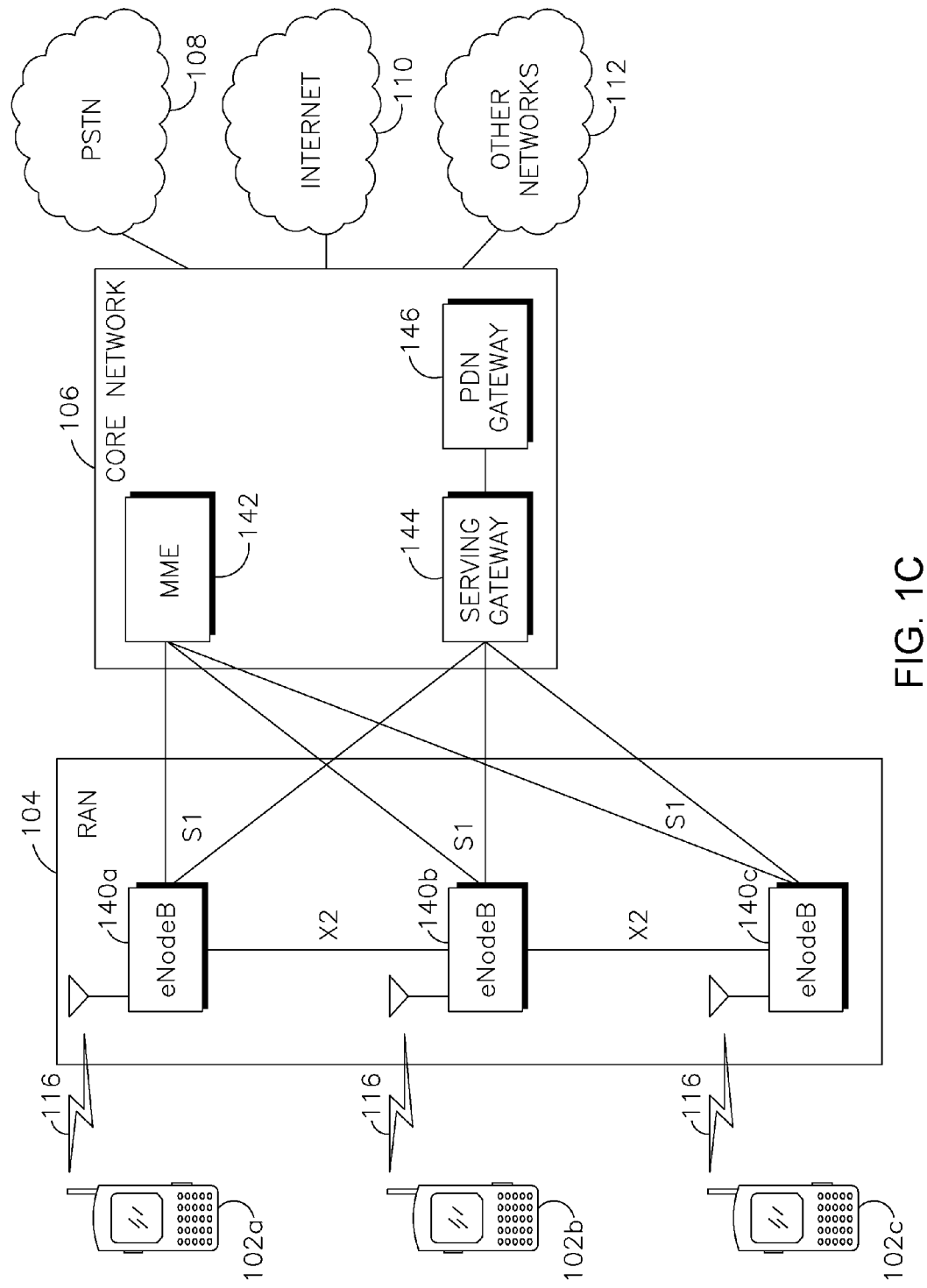
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

New session transfer protocols, which may be based on an existing protocol, may be used to enable IUT of media sessions without using an IMS framework. The new non-IMS session transfer protocols may be a proxy mobile internet protocol (PMIP) or a general packet radio service (GPRS) tunneling protocol (GTP). Both of these protocols enable one end point of a flow or set of flows between a corresponding node (CN) and a first WTRU to be moved to a second WTRU, while maintaining the same internet protocol (IP) address from the CN's perspective. While PMIP and GTP are described herein, other control protocols may be used.

In PMIP, the mobile device does not know it is running over a network using PMIP. PMIP may be used for handover. A device may register with a network and obtain a home address (HoA), (i.e., IP address), and will continue to maintain the same HoA even after a change to another network. In addition, once IUT occurs between devices, instead of routing data to a new device via the new device's HoA, the data is routed to the original device's IP address, which is associated with the new device care of address (CoA).

A WTRU may establish a communication session including a plurality of media flows with a remote device or server. The communication session, or one or more of the media flows, may be transferred to, or duplicated on, one or more other WTRUs. IUT may be performed using a protocol, such as PMIP or GTP.

A general trend towards real-time social media, whereby end users are able to share and consume the same media content in real-time, drives a need for transmission of media streams across several devices while maintaining a static IP address from the view of a CN. The herein framework allows for the transfer of one end point of a media flow from a first WTRU in communication with a CN, to a second WTRU without changing the reference IP address from the point of view of the CN. These mechanisms may be embodied in any IP network.

Figure 2:
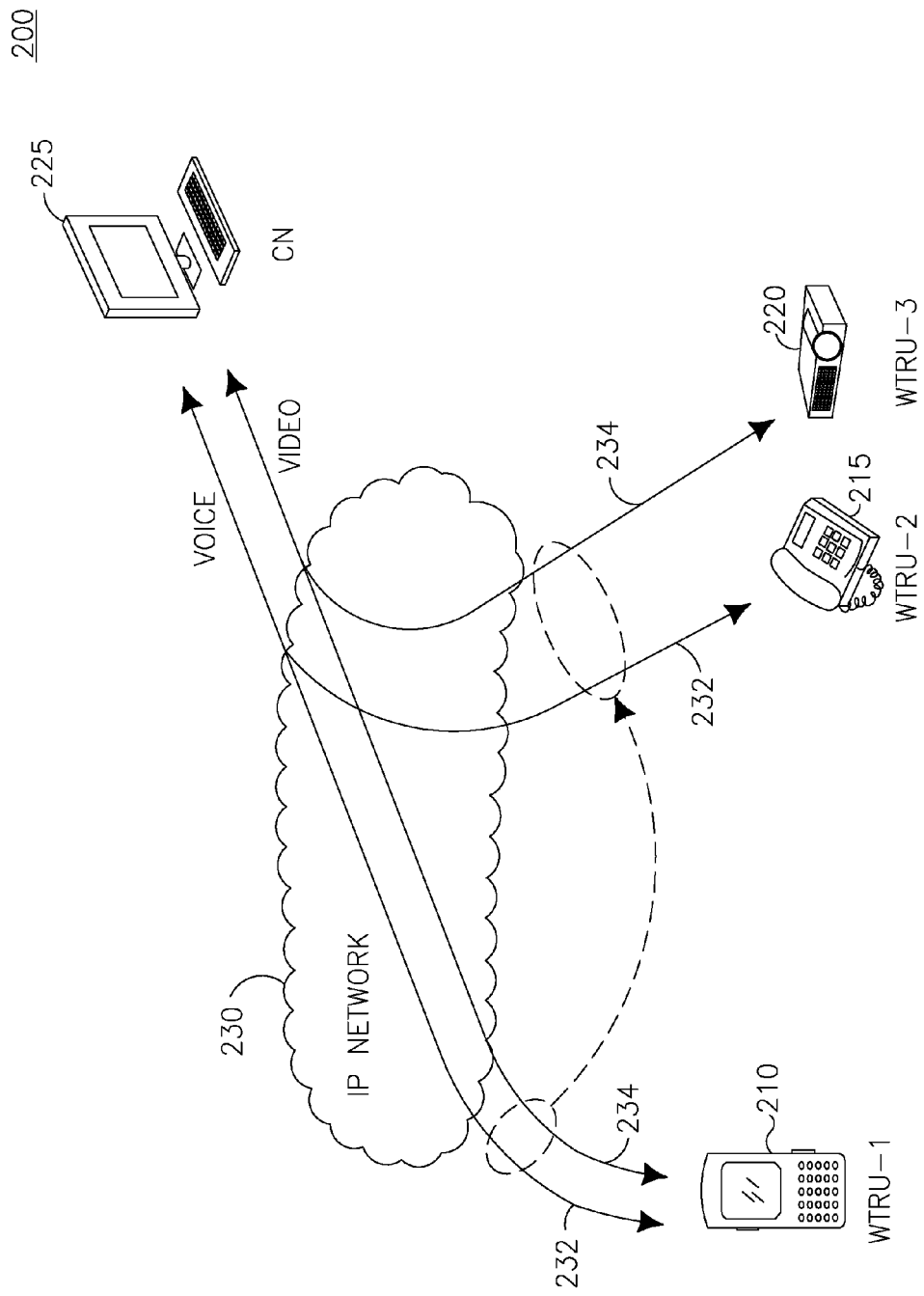
FIG. 2 shows a high level diagram of IUT of media flows, wherein the media flows may be transferred, modified, duplicated or retrieved between IP media clients across any IP based network.

FIG. 2 shows a high level diagram 200 of IUT of media flows 232, 234 (i.e., voice and/or video sessions) wherein the media flows 232, 234 may be transferred, modified, duplicated or retrieved between IP media clients (e.g., WTRUs) across any IP based network 230. WTRU-1 210 establishes a voice and video session with WTRU-2 225, which may be a media server, over an IP network 230. WTRU-1 210 may decide to initiate an IUT of session information, or to initiate a collaborative session with WTRU-3 215 and/or WTRU-4 220. WTRU-1 210 may establish a connection with WTRU-3 215 over an IP network 230 in order to transfer voice information. Similarly, WTRU-1 210 may establish a connection with WTRU-4 220 over an IP network 230 in order to transfer video information.

Any standard media protocol may be used with the media flows. In addition, any IP network as well as the Web may be used with the media flows.

At any point in the method of FIG. 2, additional actions may be performed between WTRU-1 210, WTRU-2 225, WTRU-3 215 and WTRU-4 220.

Figure 3:
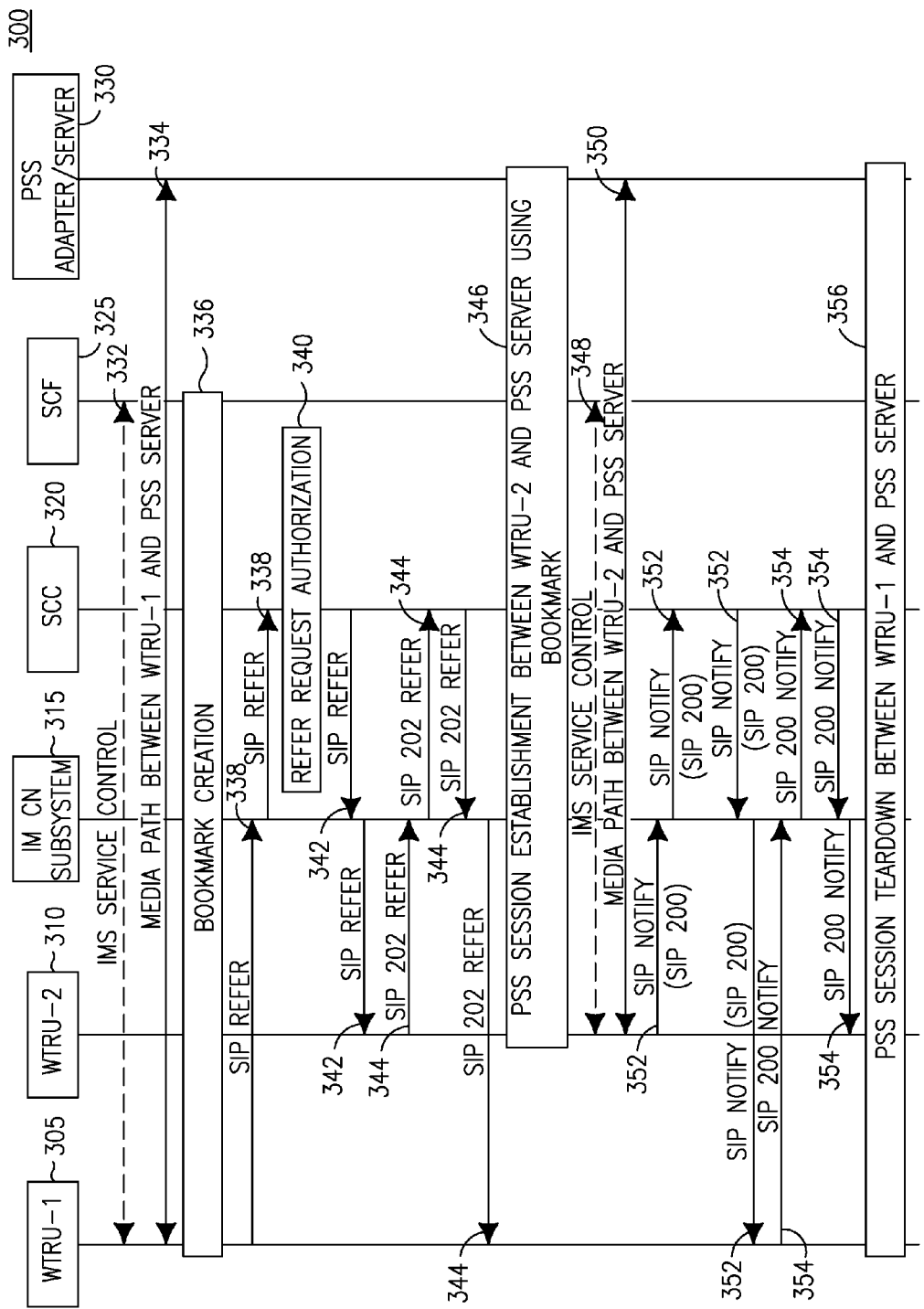
FIG. 3 shows a detailed diagram of an example of IUT of media flows between one or more WTRUs.

FIG. 3 shows a detailed diagram 300 of an example of IUT of media flows between one or more WTRUs using a packet switched streaming (PSS) server. Any standard media protocol may be used with the media flows. In addition, any IP network as well as the Web may be used with the media flows.

An IMS service control media session 332 may be established between WTRU-1 305 and the service capability feature (SCF) 325. WTRU-1 305 may establish a media path 334 with the PSS server 330 and may create a bookmark 336 with the SCF 325. WTRU-1 305 may send a SIP refer message 338 to the service centralization and continuity mechanism (SCC) 320 via the IM CN subsystem 315. The SCC 320 may refer the request authorization 340 by sending a SIP refer message 342 to WTRU-2 310 via the IM CN subsystem 315. WTRU-2 310 may send a SIP refer acknowledgment message 344 to SCC 320 via the IM CN Subsystem 315. SCC 320 may send a SIP refer acknowledgment 344 to the WTRU-1 304 via the IM CN subsystem 315.

A PSS session 346 may be established between WTRU-2 310 and PSS adapter/server 330 using a bookmark. An IMS Service control media session 348 may be established between WTRU-2 310 and the SCF 325 and a media path 350 may be established between WTRU-2 310 and the PSS adapter/server 330. A SIP notify acknowledgment 352 may be sent by WTRU-2 310 to the SCC 320 via the IM CN subsystem 315. The SCC 320 may send the SIP Notify acknowledgement 352 to WTRU-1 305 via the IM CN subsystem 315. WTRU-1 305 may send a SIP acknowledgement 354 to the SCC 320 via the IM CN subsystem 315. The SCC 320 may send a SIP acknowledgement 354 to WTRU-2 310 via the IM CN subsystem 315. A PSS session teardown 356 between WTRU-1 305 and the PSS server 330 may occur.

At any point in the embodiment of FIG. 3, additional actions may be performed between the WTRU-1 305, WTRU-2 310, the IM CN Subsystem 315, SCC 320, SCF 325 and the PSS adapter/server 330.

Figure 4A:
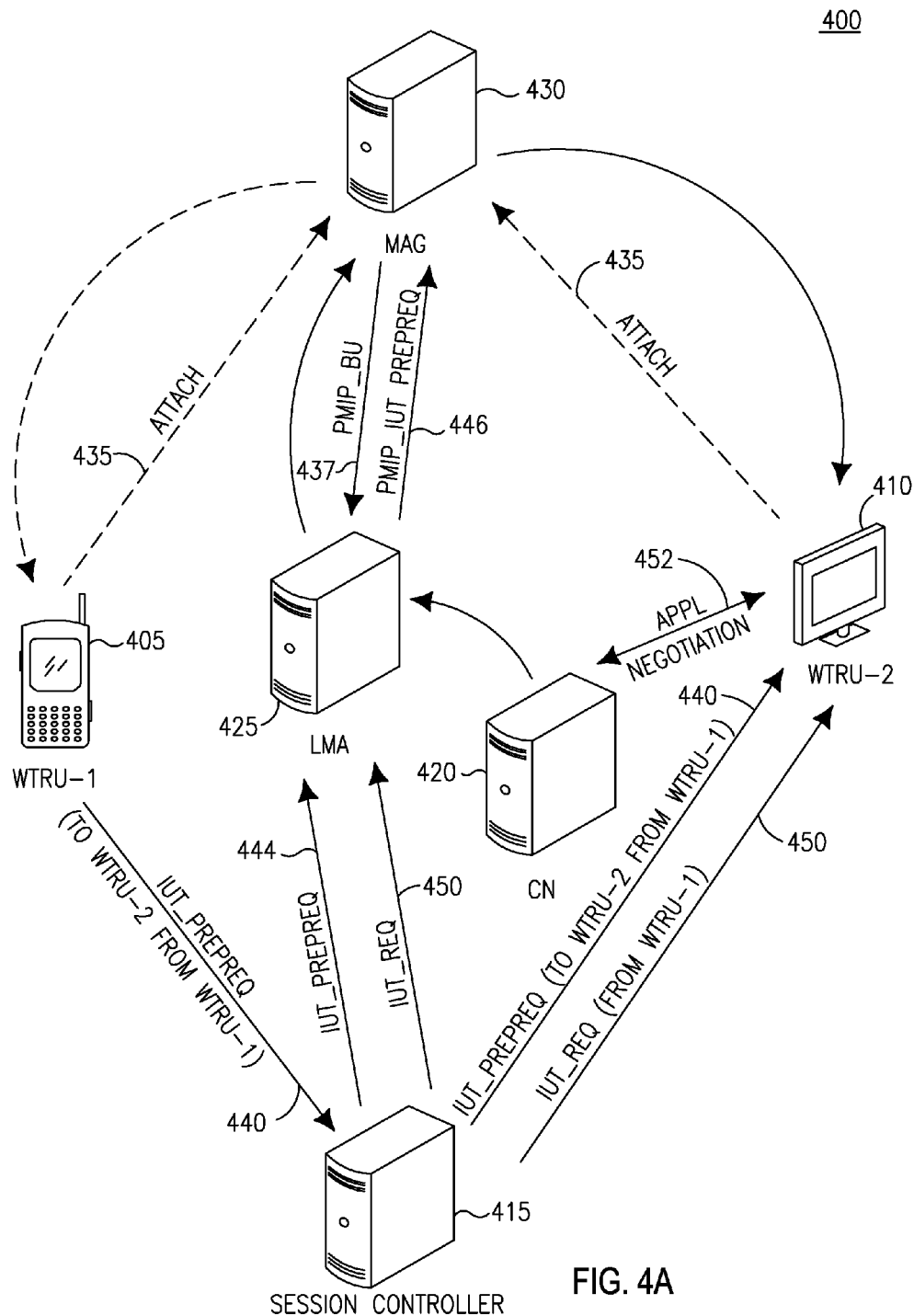
FIG. 4A shows a diagram of a media session transfer between WTRU-1 and WTRU-2 where WTRU-1 and WTRU-2 are in communication with the same LMA and MAG.
Figure 4B:
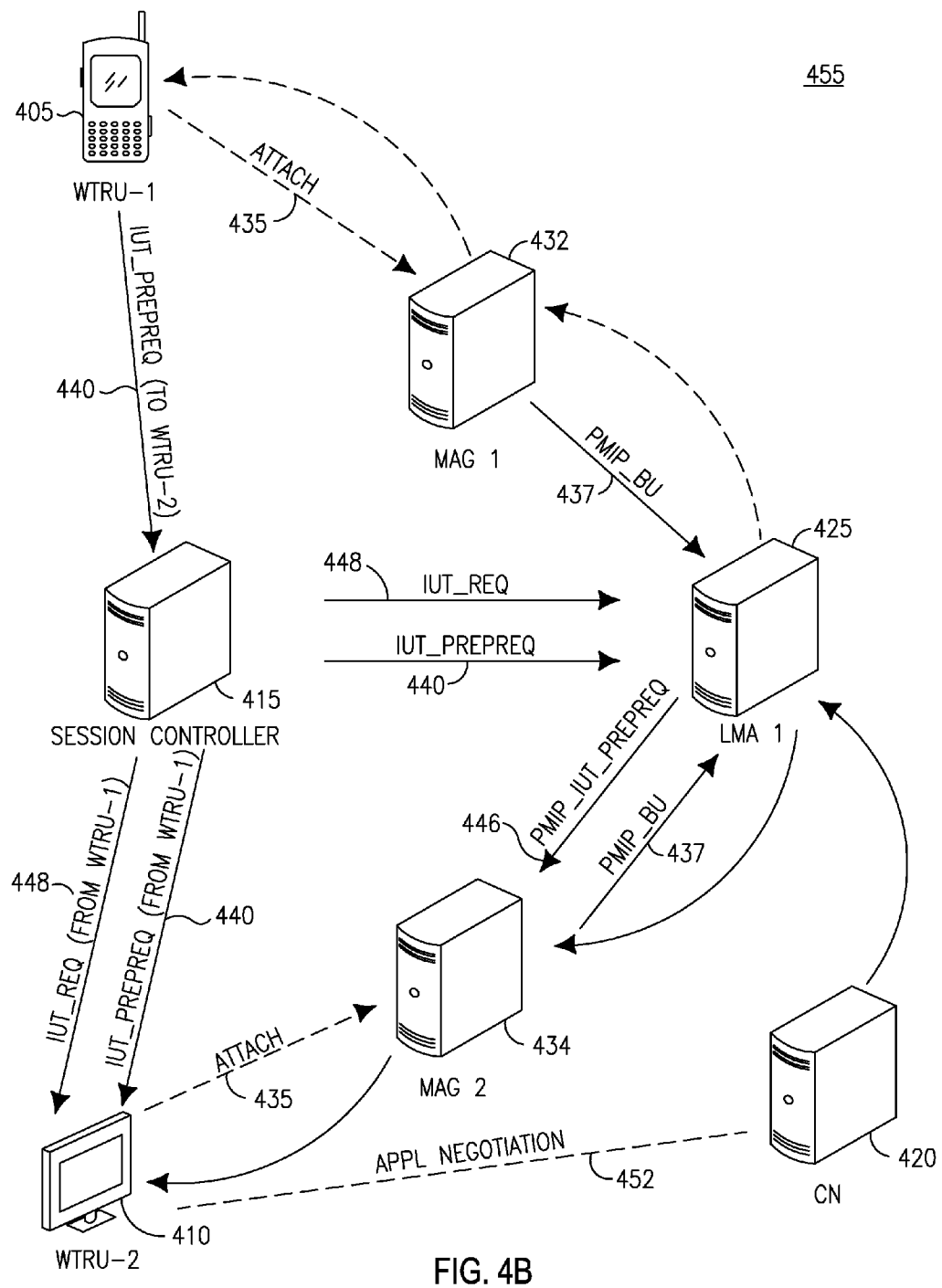
FIG. 4B shows a diagram of a media session transfer between WTRU-1 and WTRU-2 where WTRU-1 and WTRU-2 are in communication with the same LMA and different MAGs.
Figure 4C:
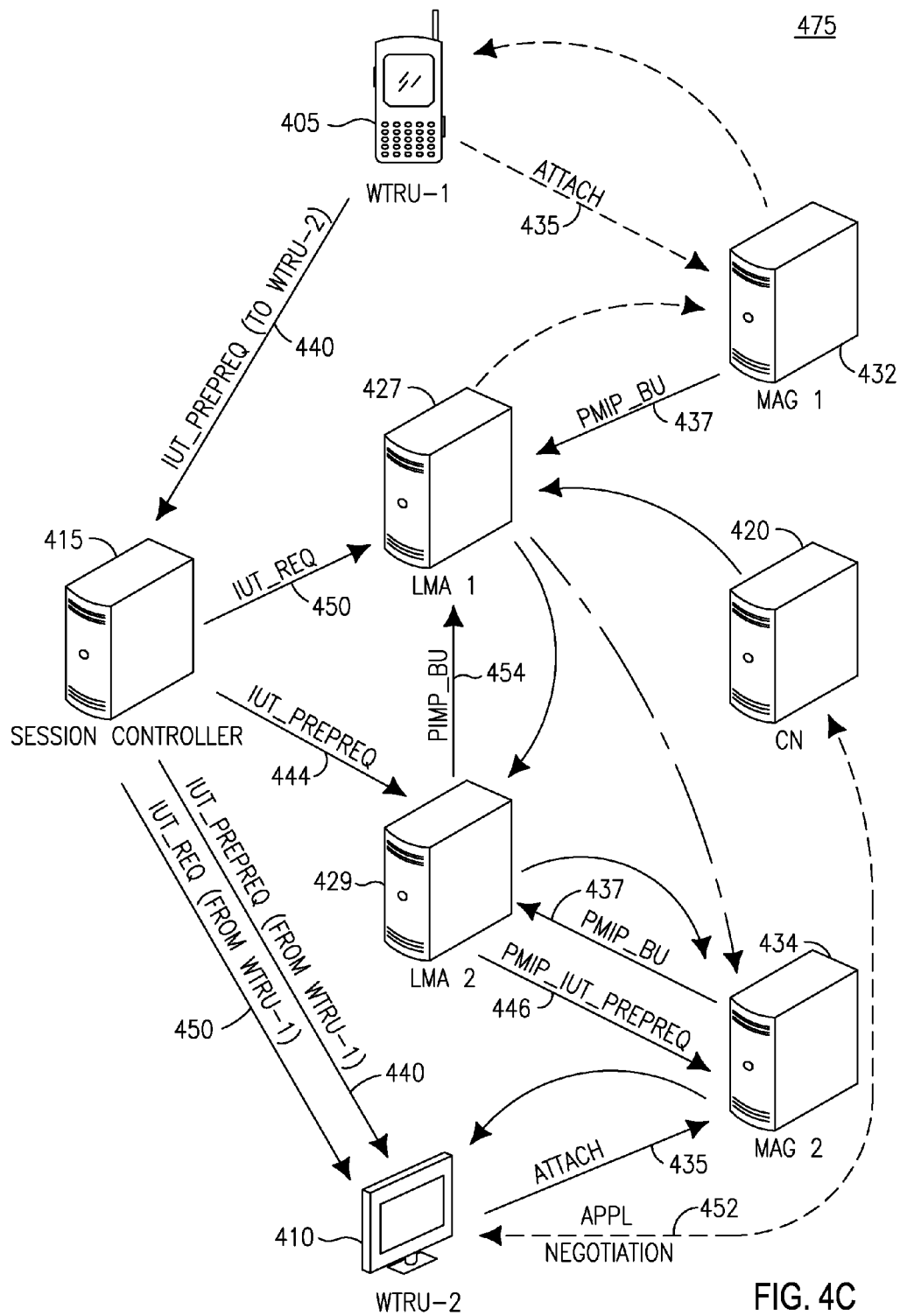
FIG. 4C shows a diagram of a media session transfer between WTRU-1 and WTRU-2 where WTRU-1 and WTRU-2 are in communication with the different LMAs and different MAGs.

FIGS. 4A, 4B and 4C show embodiments of IUT using PMIP. For example, a session may be transferred from one device to one or more target devices. A new IUT protocol may be used between a device and a session controller (SC) or a SC and an LMA. Either a PMIP protocol or an IUT protocol may be used between the SC and the LMA.

Interactions using PMIP may also occur between an LMA and a mobility access gateway (MAG), a source LMA and a target LMA or one or more LMAs and a SC.

PMIP is an updated version of a mobile internet protocol (MIP). In MIP binding tables a home address (HoA) is associated with a single care-of-address (CoA). The CoA is then updated when the user moves to another location or technology.

Dual stack MIP (DSMIP) allows for the registration of addresses and prefixes for internet protocol versions 4 and 6 (IPv4, IPV6) and may transport of IPv4 and IPv6 packets over a tunnel to a home agent. In addition, a mobile node is able to roam over both IPv4 and IPv6.

MIP allows for multiple bindings. A binding identification (BID) mobility extension may exist in a biding update (BU) and/or a binding acknowledgment (BA). Multiple binding entries on an LMA or CN may occur where multiple CoA are associated to a HoA. WTRUs may generate the BID for each CoA.

MIP also allows for flow bindings. A flow identification (FID) mobility extension may exist in a BU and or a BA. The FID may allow for the binding of a particular flow to one or more CoAs without affecting other flows using the same HoA. Traffic selectors may be used to identify flows and compare the flows with incoming IP packets. Flow bindings may allow specific policies to be associated with each binding entry. Specific polices may include but are not limited to deleting or forwarding to an associated CoA IP packets.

The LMA may maintain PMIP bindings. For example, HoA-CoA bindings. IUT specific protocols may be implemented by the LMA but may not be needed if the PMIP protocol is used for communications with the SC. A source LMA may handle redirection using a binding table. For example, a source LMA may redirect data to a target LMA. The target LMA may redirect the data to the target WTRU by de-tunneling and re-tunneling to a target MAG. In another embodiment, a source LMA may redirect data directly to a target MAG using a target CoA. A target LMA may interact with a source LMA to update a target WTRUs CoA, each time a packet binding update (PBU) is received from a target MAG.

A MAG is a proxy that performs mobility management on behalf of WTRUs using PMIP. A tunnel is created between the MAG and the LMA. Upon receipt of a packet sent to a CoA, the MAG compares an inner destination address of the packet to an entry on its visitor list and removes an outer header from the packet before forwarding the packet to the WTRU. Since the MAG compares the inner destination address to those entries in its visitor list, it must be informed that packets destined to the source WTRU are allowed to be forwarded to the target WTRU.

In order to prepare and execute a device transfer and correctly handle received data on the target device, an IUT preparation process, IUT execution process and an IUT completion process may occur. During IUT preparation, a session controller (SC) handles a sequence of operations. The SC may set up the session for IUT. The SC is used to control the IUT and to pass information from one WTRU to another WTRU. Before transfer of the session, the target WTRU must be ready to receive the session. Also, the LMA and MAG must update their respective binding tables prior to transfer of the session. In the binding table, a mapping may exist between the HoA of the mobile node and the CoA, where the mobile node may be reached at a certain point.

During preparation, the CN may not know that the session is moving from one device to another and may continue to send data to the same IP address, HoA, of the mobile node. Based on the mapping in the biding table, the packets may be sent to the correct node based on the mapping of its HoA to CoA.

During device transfer, packets of information may be routed from the LMA to the MAG then the target WTRU. After transfer, the packets may be transferred to the same LMA as before, but may be transferred to a different MAG if the target WTRU has updated its connection and is connected through another MAG. The target MAG may need to update its table to handle the received packets correctly.

Prior to transfer, a target WTRU may start the application, if not already stared. A target LMA and a target MAG may update their binding tables to be able to handle forwarding to the target WTRU. During IUT execution, a source LMA may update its binding table with updated HoA-CoA mapping information in order to redirect the data to the target WTRU. During IUT completion, a target WTRU may renegotiate its parameters with the CN. A source WTRU may be informed that IUT may be completed and cleanup may be performed.

FIG. 4A shows a source WTRU 405 and a target WTRU 410 that are connected to the same MAG 430 and are registered with the same LMA 425. Either a PMIP protocol or a IUT protocol may be used between the SC 415 and the LMA. In this embodiment, 400, both the source WTRU, WTRU-1 405, and the target WTRU, WTRU-2 410, perform an attach procedure 435 with the MAG 430. The MAG 430 may send a proxy binding update (PMIP_BU) 437 to the LMA 425. The proxy binding update 437 updates the CoA where IP packets should be redirected. It may be used between LMAs, when multiple LMAs are used. A (P) flag in the proxy binding update 437, may be sent to indicate that the proxy binding update is not sent by the mobile itself. A use "home network prefix" option may be used to carry the IP address of packets for redirection. An "Alternate CoA" option maybe used to carry the target CoA.

WTRU-1 405 may send an IUT_PrepReq 440 to WTRU-2 410 via the SC 415. The IUT_PrepReq 440 indicates that preparation may be done in order to be prepared for IUT. A WTRU receiving this message may begin preparations to receive the application's data. The IUT_PrepReq 440 may include but is not limited to an original destination IP address that may be specified in the IP packet of the source WTRU, a redirect destination IP address of where the packet may be redirected and application data required by the application on the target WTRU. The SC 415 may also send the IUT_PreqReq 444 to the LMA 425. An IUT_PrepAck may be sent in response to the IUT_PrepReq 440 and may include the status of the request, a redirect destination IP address of where the IP packet should be redirected, the target CoA and any other information.

The LMA 425 may generate and send a PMIP_IUT_PrepReq 446 to the MAG 430. The PMIP_IUT_PrepReq 446 may include but is not limited to an original destination IP address that may be specified in the IP packet of the source WTRU, a redirect destination IP address of where the packet may be redirected and application data required by the application on the target WTRU. This request indicates that IP packets destined to a source WTRU will be redirected to a target WTRU. The LMA 425 may forward the information to the target WTRU serving MAG 430. The MAG 430 may keep the information in its binding table to be able to redirect the IP packets to the target WTRU 410. A PMIP_IUT_PrepAck may be sent in response to the PMIP_IUT_PrepReq 446 and may include the status of the request or any other information.

The SC 415 may send a IUT_Req 478 to WTRU-2 410 and the LMA 425 from WTRU-1 405. The IUT_Req 450 may include an original destination IP address and a redirect destination IP address. This request indicates that IUT may be performed between the original address and the redirected address. WTRU-2 410 may perform application negotiation 452 with the CN 420. The target WTRU 410 may trigger an application's parameter negotiation, which may include a codec or a bitrate, with the CN 420. A binding table may also be updated on a source LMA 425. The CN 420 may not be aware that the data sent to a WTRU is redirected to another WTRU since the CN 420 is always sending data to the same destination IP address. A target WTRU 410 stores the destination IP address and configures its interface to be able to receive packets via the destination IP address, since the CN 420 is sending the data to the same IP address, even after IUT. An IUT-Ack may be sent in response to the IUT_Req 450 and may include the status of the request.

The source WTRU 405 is responsible for triggering IUT with a target WTRU 410 through interaction with the SC 415. An IUT protocol is used by WTRUs and LMAs with their interaction with the SC 415. A PMIP protocol may also be used. The SC 415 handles IUT preparation by interacting with the source and target WTRUs and LMAs. The SC 415 may be co-located with the LMA 425 so that direct communications between the source and target LMAs may be done using PMIP or IUT protocols. The SC 415 may also handle authorization with the source and target LMAs.

At any point in the method of FIG. 4A, additional actions may be performed between WTRU-1 405, WTRU-2 410, SC 415, MAG 430, LMA 425 and CN 420.

FIG. 4B shows a source WTRU 405 and a target WTRU 410 that are connected to different MAGs and are registered with the same LMA 425. In this embodiment 455, the source WTRU, WTRU-1 405, and the target WTRU, WTRU-2 410, perform an attach procedure 435 with the MAG-1 432 and MAG-2 434, respectively. The MAG-1 432 and the MAG-2 434 may send a PMIP_BU 437 to the LMA 425.

WTRU-1 405 may send an IUT_PrepReq 440 to WTRU-2 410 via the SC 415. The SC 415 may also send the IUT_PreqReq 440 to the LMA 425. The LMA 425 may generate and send a PMIP_IUT_PrepReq 446 to the MAG-2 434. The SC 415 may send a IUT_Req 448 to WTRU-2 410 and the LMA 425 from WTRU-1 405. WTRU-2 410 may perform application level negotiation 452 with the CN 420.

At any point in the method of FIG. 4B, additional actions may be performed between WTRU-1 405, WTRU-2 410, SC 415, MAG-1 432, MAG-2 434, LMA 425 and CN 420.

FIG. 4C shows a source WTRU 405 and a target WTRU 410 that are connected to different MAGs and are registered with different LMAs. In an embodiment 475, the data is going from a source LMA 427 to the target LMA 429 before begin forwarded to the target MAG 434. In another embodiment, the data may be forwarded directly to the target MAG 434 by the source LMA 427.

In FIG. 4C, the source WTRU, WTRU-1 405, and the target WTRU, WTRU-2 410, perform an attach procedure 435 with the MAG-1 432 and MAG-2 434, respectively. The MAG-1 432 and the MAG-2 434 may send a PMIP_BU 437 to LMA-1 427 and LMA-2 429, respectively.

WTRU-1 405 may send an IUT_PrepReq 440 to WTRU-2 410 via the SC 415. This request 440 notifies WTRU-2 410 to prepare for IUT. The request 440 may include information such as but not limited to the HoA of WTRU-1 405. The SC 415 may also send the IUT_PreqReq 444 to the LMA-2 429, so that the LMA-2 may update its binding table. The LMA-2 429 may generate and send a PMIP_IUT_PrepReq 446 to the MAG-2 434.

The SC 415 may send a IUT_Req 450 to WTRU-2 410 and the LMA-1 427 from WTRU-1 405. The IUT_Req 450 is a notification that IUT may occur. The LMA-1 427 may update its binding table so that it is able to redirect the data. At this time the transfer occurs. After the transfer occurs, WTRU-2 410 may perform application negotiation 452 with the CN 420. The LMA-2 429 may send a PMIP_BU 454 to the LMA-1 427. This notification may include any further changes in the point of attachment of WTRU-2 410. For example, WTRU-2 410 may have transferred to a MAG-3.

At any point in the method of FIG. 4C, additional actions may be performed between WTRU-1 405, WTRU-2 410, SC 415, MAG-1 432, MAG-2 434, LMA-1 427, LMA-2 429 and CN 420.

Figure 5:
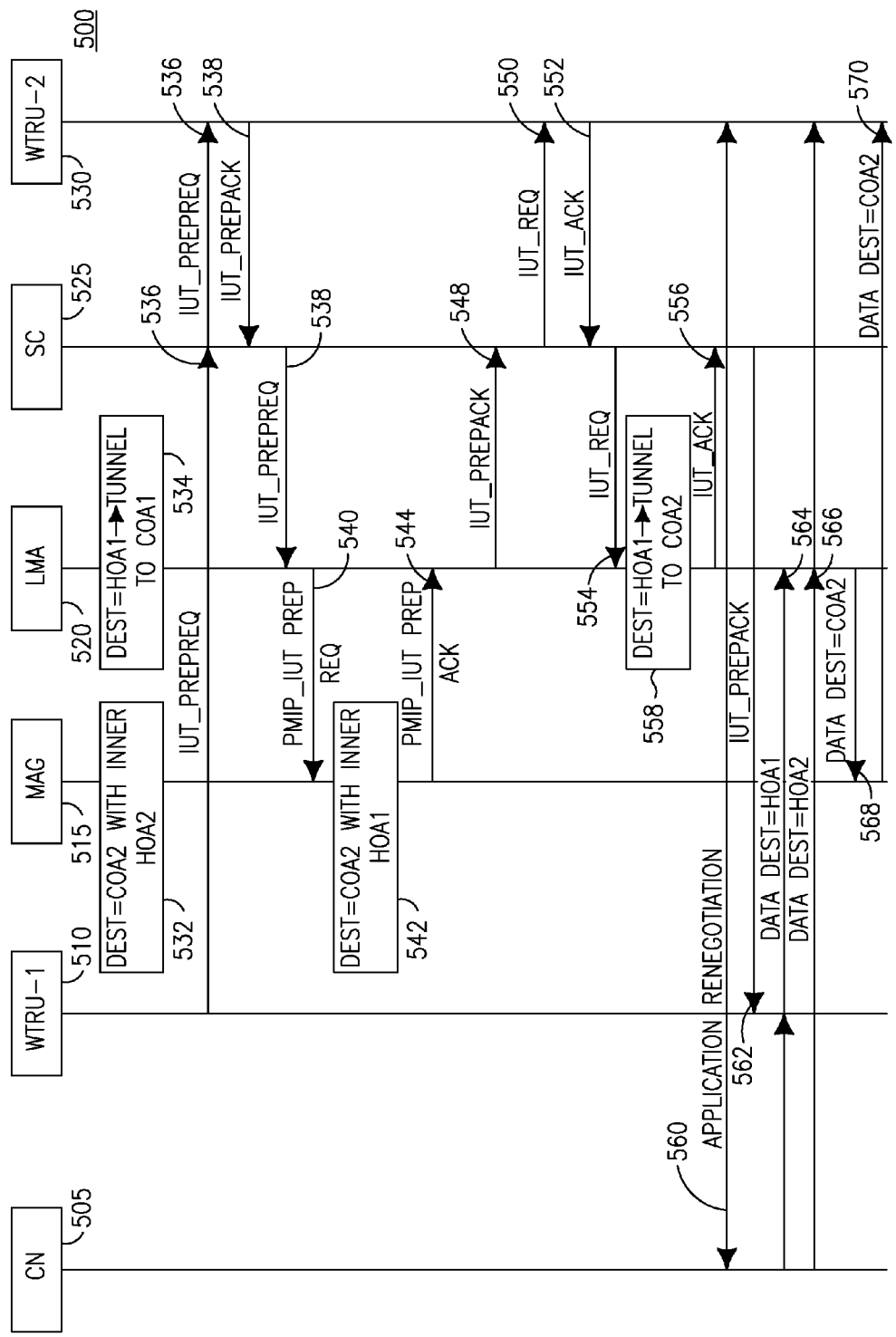
FIG. 5 is a flow diagram of redirection of media session information by the LMA to the MAG.

FIG. 5 is a flow diagram of redirection of media session information 500 by the LMA 520 to the MAG 515 where the WTRU-1 505 and WTRU-2 530 are in communication with the same LMA 520 and the same MAG 515.

The LMA 520 updates its binding table 534 so that the HoA1 is redirected to MAG 515 by tunneling to the CoA1. The MAG 515 updates its binding table 532 so that the CoA2 is linked to the inner HoA2. Both LMA and MAG maintain a binding table. In this example, the MAG may have a binding table associating the HoA1 with CoA1 and HoA2 with CoA2. The LMA also has a biding table associating the HoA1 with CoA1 and HoA2 with CoA2. After IUT, both the LMA and the MAG may have a binding table with HoA1 associated with CoA2 and HoA2 associated with CoA2, where all data is being transferred to WTRU2. The MAG 515 removes an extra IP header from the received data prior to forwarding the data to WTRU-2 530. WTRU-1 510 triggers an IUT via an IUT_PrepReq 536 sent to the WTRU-2 530 via the SC 525. The SC 525 also sends the IUT_PrepReq 538 to the LMA 520. WTRU-2 530 sends an IUT_PrepReq 538 to the SC 525 and begins to prepare for IUT by starting the application if it is not already running.

The LMA 520 sends a PMIP_IUT_PrepReq 540 to the MAG 515. The MAG 515 updates it binding table 542 to handle the redirected data TO CoA2 to the original address of HoA1, and sends an PMIP_IUT_PrepAck 544 to the LMA. The LMA 520 sends a IUT_PrepAck 525 to the SC 548. The SC 525 sends an IUT_Req 550, 554 to the WTRU-2 530 and the LMA 520. The LMA 520 updates its binding table 558 with information regarding the target's, WTRU-2s, CoA2. WTRU-2 530 and the LMA 520 send a IUT_ACK 552, 556 to the SC 525. WTRU-2 530 begins application level renegotiation 560 with the CN 505. The SC 525 sends an IUT_PrepAck 562 to WTRU-1 510.

The CN 505 sends data 564, 566 to either WTRU-1 (HoA1) 510 or WTRU-2 (HoA2) 530. The data 564, 566 is application data and is not related to the IUT. All data 564, 566 is routed to the LMA 520, which redirects the data 568 to the MAG 515. The MAG 515 then redirects the data 570 to WTRU-2 (CoA2) 530. Once the IUT is completed, the all data 564, 566 from the CN 505 is redirected to the target WTRU, WTRU-2 530.

At any point in the method of FIG. 5, additional actions may be performed between WTRU-1 510, WTRU-2 530, SC 525, MAG 515, LMA 520, SC 525 and CN 505.

Figure 6:
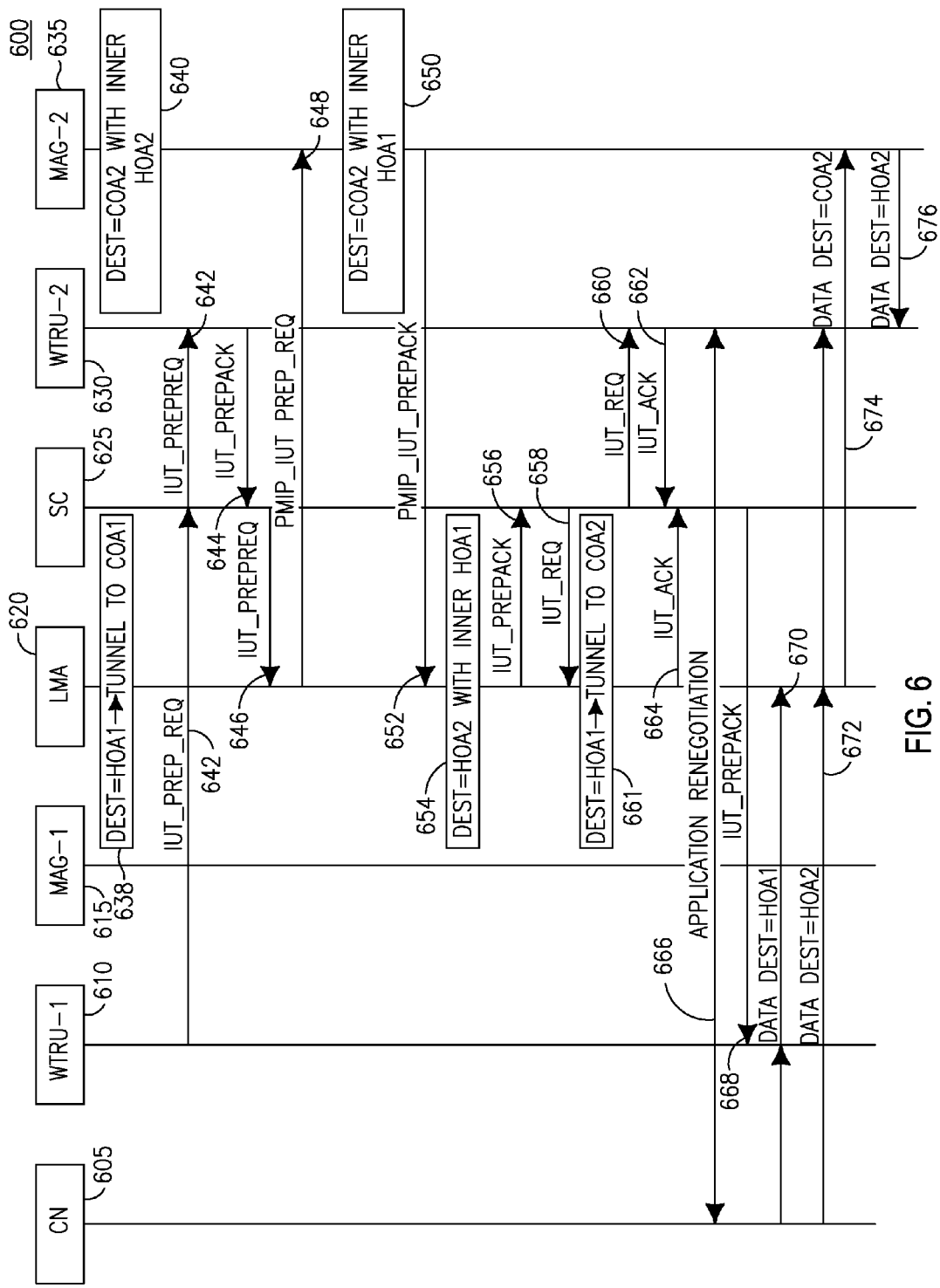
FIG. 6 is a flow diagram of redirection of media session information by the LMA to a target MAG.

FIG. 6 is a flow diagram of redirection of media session information 600 by the LMA 620 to the MAG-2 635 where the WTRU-1 610 and WTRU-2 630 are in communication with the same LMA 620 and with different MAGs 615 and 635, respectively.

The LMA 620 updates its binding table 638 so that the HoA1 is redirected to MAG-1 by tunneling to the CoA1. The MAG-2 635 updates its binding table 640 so that the CoA2 is linked to the inner HoA2. The MAG-2 635 removes an extra IP header from the received data prior to forwarding the data to WTRU-2 630. WTRU-1 610 triggers an IUT via an IUT_PrepReq 642 sent to the WTRU-2 630 via the SC 625. The SC 625 also sends the IUT_PrepReq 646 to the LMA 620. WTRU-2 630 sends an IUT_PrepAck 644 to the SC 625 and begins to prepare for IUT by starting the application if it is not already running.

The LMA 620 sends a PMIP_IUT_PrepReq 648 to the MAG-2 635. The MAG-2 635 updates it binding table 650 to handle the redirected data to CoA2 which is mapped to HoA1, and sends an PMIP_IUT_PrepAck 652 to the LMA 620. The LMA 620 updates its binding table 654 and sends a IUT_PrepAck 656 to the SC 625. The SC 625 sends an IUT_Req 660 to the WTRU-2 630 and an IUT_Req 658 to the LMA 620. The LMA 620 updates its binding table 661 with information regarding the target CoA2. WTRU-2 630 and the LMA 620 send a IUT_ACK 664 to the SC 625. WTRU-2 630 begins application level renegotiation 666 with the CN 605. The SC 625 sends an IUT_PrepAck 668 to WTRU-1 610.

The CN 605 sends data 670, 672 to either WTRU-1 (HoA1) 610 or WTRU-2 (HoA2) 630. The data 670, 672 is application data and is not related to the IUT. All data 670, 672 is routed to the LMA 620, which redirects the data 674 to the MAG-2 635 (CoA2). The MAG-2 635 then redirects the data 676 to WTRU-2 (HoA2) 630. Once the IUT is completed, the all data 670, 672 from the CN 605 is redirected to the target WTRU, WTRU-2 630.

At any point in the method of FIG. 6, additional actions may be performed between WTRU-1 610, WTRU-2 630, SC 625, MAG-1 615, MAG-2 635, LMA 620, SC 625 and CN 605.

Figure 7A:
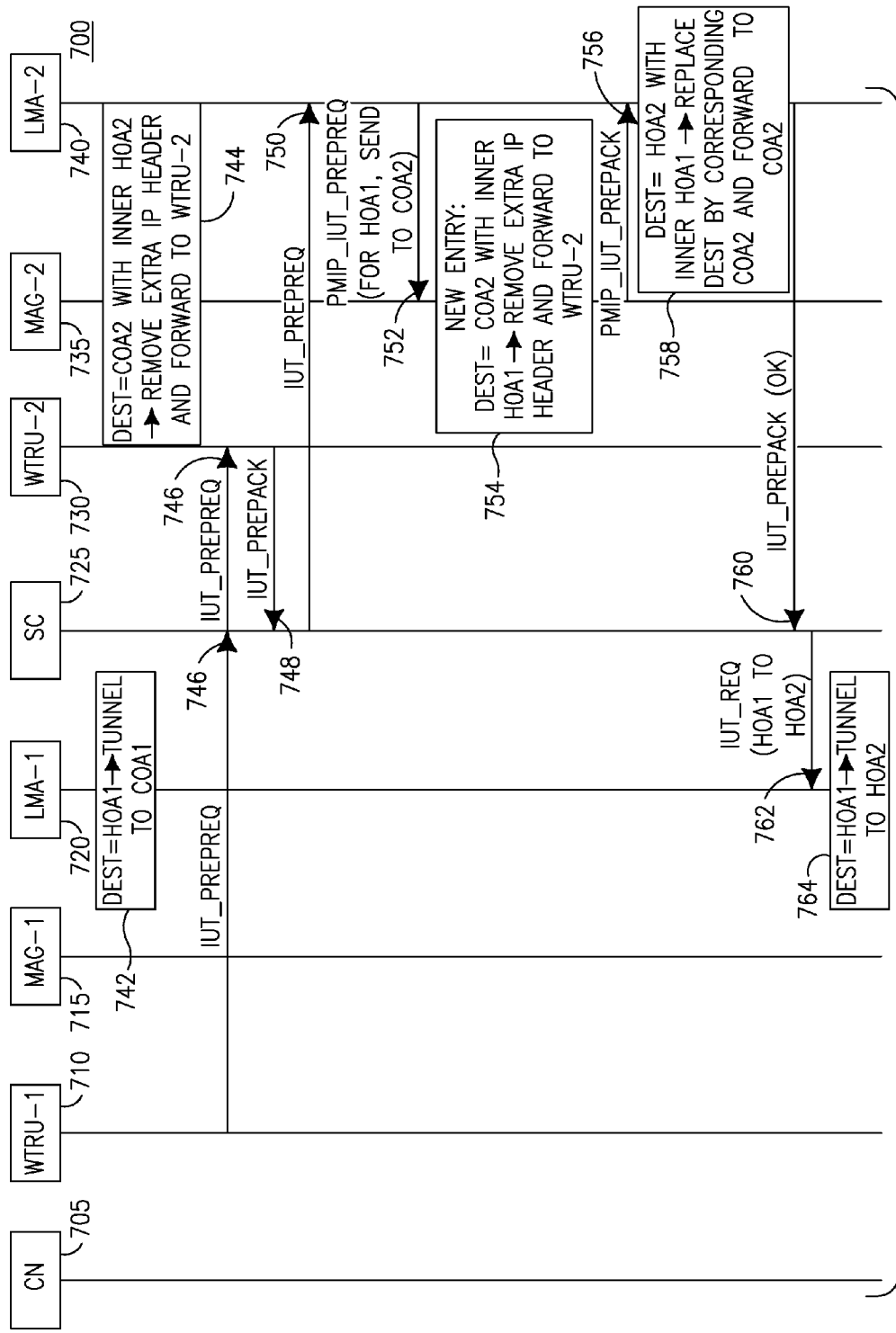
FIG. 7A is a flow diagram of redirection of media session information from a source LMA to a target LMA.
Figure 7B:
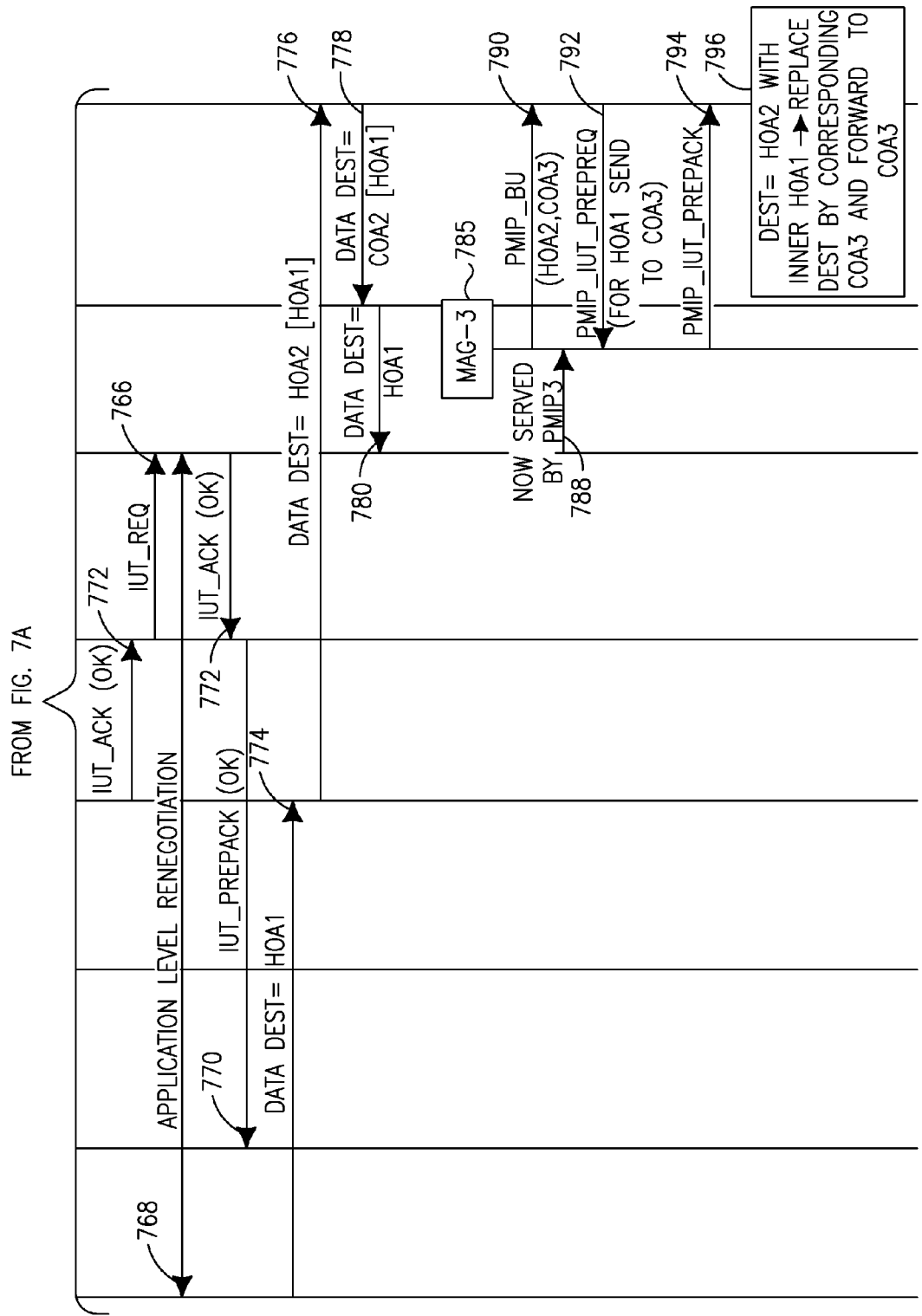
FIG. 7B is a continuation of FIG. 7A.

FIGS. 7A and 7B are flow diagrams of redirection of media session information 700 by the LMA-2 740 to the MAG-2 735 where the WTRU-1 710 and WTRU-2 730 are in communication with different LMAs and with different MAGs and wherein data is transmitted from a source LMA, LMA-1 720, to a target LMA, LMA-2 740.

The LMA-1 720 updates its binding table so that the HoA1 of WTRU-1 710 is mapped to CoA1 by de-tunneling and re-tunneling. The MAG-2 735 updates its binding table 744 so that the CoA2 is linked to the inner HoA2 of WTRU-2 730. The MAG-2 735 removes an extra IP header from the received data prior to forwarding the data to WTRU-2 730. WTRU-1 710 triggers an IUT via an IUT_PrepReq 746 sent to the WTRU-2 730 via the SC 725. The SC 725 also sends the IUT_PrepReq 750 to the LMA-2 740. WTRU-2 730 sends an IUT_PrepAck 748 to the SC 725 and begins to prepare for IUT by starting the application, if it is not already running.

The LMA-2 740 sends a PMIP_IUT_PrepReq 752 to the MAG-2 735. This request includes the HoA1 and CoA2. The MAG-2 735 updates it binding table 754 to handle the redirected data original address to HoA1 mapping the data to CoA2, and sends an PMIP_IUT_PrepAck 756 to the LMA-2. The LMA-2 updates its binding table 758 so that the HoA2 with inner HoA1 is replaced by CoA2 and is forwarded to CoA2, and sends a IUT_PrepAck 760 to the SC 725. The SC 725 sends an IUT_Req 766 to the WTRU-2 730 and an IUT_Req 762 to the LMA-1 720. The LMA-1 720 updates its binding table 764 with information regarding the target HoA2 so that data is forwarded to the WTRU-2 730 instead of WTRU-1 710. WTRU-2 730 and the LMA-1 720 send an IUT_ACK 772 to the SC 725. WTRU-2 730 begins application level renegotiation 768 with the CN 705. The SC 725 sends an IUT_PrepAck 770 to WTRU-1 710. The CN 705 sends data 774 to IP destination address HoA1 via the LMA-1 720. The LMA-1 720 determines based on the binding table that the data 776 should be sent to WTRU-2 730 at HoA2. LMA-1 720 sends the data 776 to LMA-2 740. LMA-2 740 tunnels/redirects the data 778 to MAG-2 735 based on the CoA2. MAG-2 735 sends the data 780 to WTRU-2 730.

WTRU-2 730 may be connected to MAG-2 735. On a condition that WTRU-2 730 moves and connects to MAG-3 785, WTRU-2 730 attaches 788 to MAG-3 785. WTRU-2 730 disconnects from MAG-2 735. MAG-3 785 registers WTRU-2 730 with LMA-2 740 by sending a PMIP_BU request 790 to LMA-2 740 that includes HoA2 and CoA3. LMA-2 740 knows WTRU-2s 730 CoA3 and will be able to reach WTRU-2 730 through CoA3. LMA-2 740 sends a PMIP_IUT_PrepReq 792 to MAG-3 785 and receives a PMIP_IUT_PrepAck 794 from MAG-3 785. LMA-2 740 updates its binding table 796 by replacing the destination CoA.

At any point in the method of FIGS. 7A and 7B, additional actions may be performed between WTRU-1 710, WTRU-2 730, SC 725, MAG-1 715, MAG-2 735, MAG-3 785, LMA-1 720, LMA-2 740, SC 725 and CN 705.

Figure 7C:
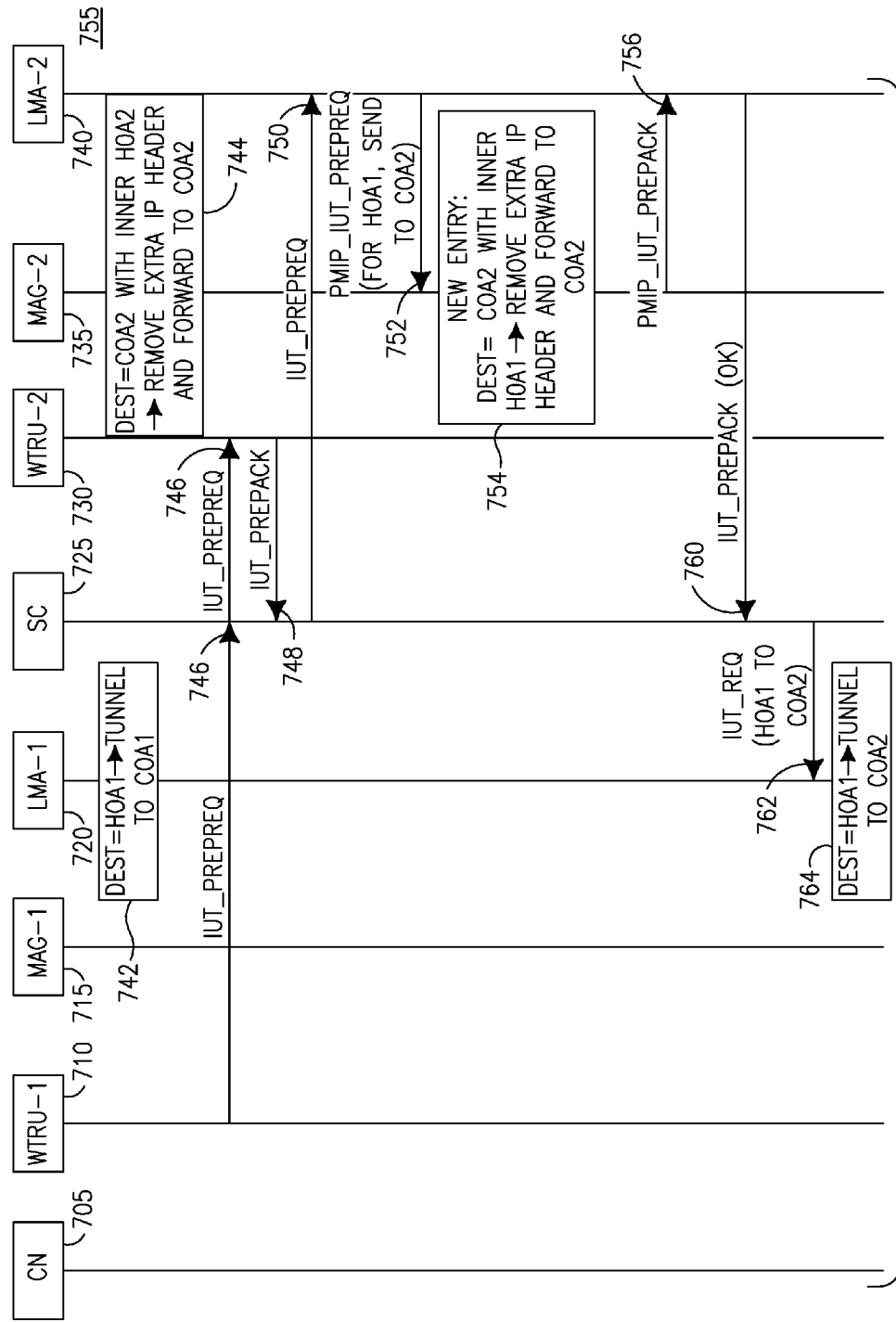
FIG. 7C is a flow diagram of redirection of media session information from a source LMA to a target MAG.
Figure 7D:
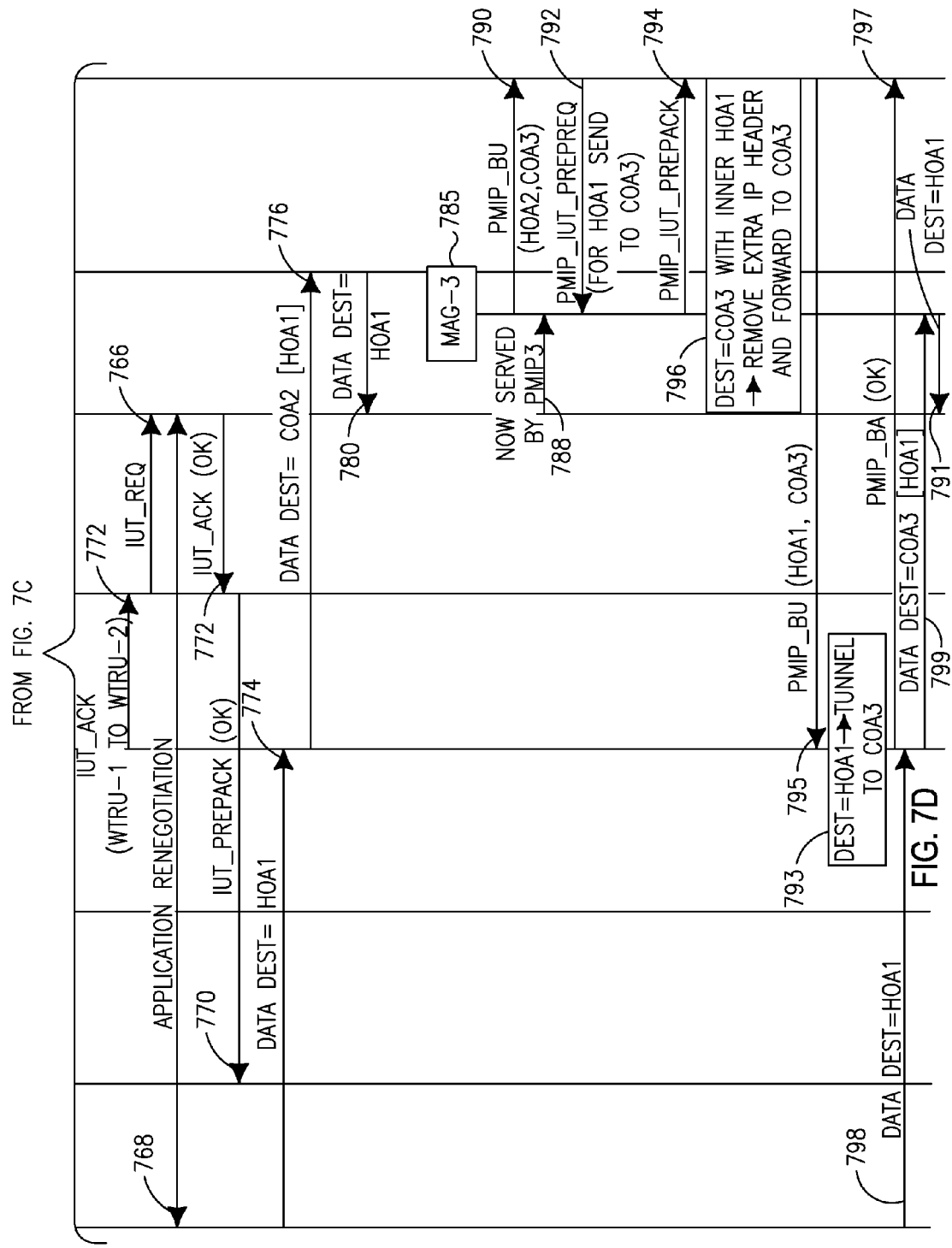
FIG. 7D is a continuation of FIG. 7C.

FIGS. 7C and 7D are a flow diagram of redirection of media session information 755 by the LMA-1 720 to the MAG-2 735 where WTRU-1 710 and WTRU-2 730 are in communication with different LMAs and with different MAGs and wherein data is transmitted from a source LMA, LMA-1 720, to a target MAG, MAG-2 735.

The LMA-1 720 updates its binding table 742 so that the HoA1 is mapped to CoA1 by de-tunneling and re-tunneling. The MAG-2 735 updates its binding table 744 so that the CoA2 is linked to the inner HoA2. The MAG-2 735 removes an extra IP header from the received data prior to forwarding the data to WTRU-2 730. WTRU-1 710 triggers an IUT via an IUT_PrepReq 746 sent to the WTRU-2 730 via the SC 725. The SC 725 also sends the IUT_PrepReq 750 to the LMA-2 740. WTRU-2 730 sends an IUT_PrepAck 748 to the SC 725 and begins to prepare for IUT by starting the application if it is not already running.

The LMA-2 740 sends a PMIP_IUT_PrepReq 752 to the MAG-2 735. This request includes the HoA1 and CoA2. The MAG-2 735 updates it binding table 754 to handle the redirected data with an original address of HoA1 mapping the data to CoA2, and sends an PMIP_IUT_PrepAck 756 to the LMA-2 740. The LMA-2 740 sends a IUT_PrepAck 760 to the SC 725. The SC 725 sends an IUT_Req 766 to the WTRU-2 730 and an IUT_Req 762 to the LMA-1 720. The LMA-1 720 updates its binding table 764 with information regarding the target HoA1 mapped to CoA2. WTRU-2 730 and the LMA-1 720 send an IUT_ACK 772 to the SC 725. WTRU-2 730 begins application level renegotiation 768 with the CN 705. The SC 725 sends an IUT_PrepAck 770 to WTRU-1 710. The CN 705 sends additional data 774 to the LMA-1 720 at the HoA1. The LMA-1 720 tunnels the data 776 to the CoA2, to MAG-2 735 directly. MAG-2 735 removes the outer IP header and forwards the data with destination HoA1 780 to WTRU-2 730.

WTRU-2 730 attaches 788 to MAG-3 785 and disconnects from MAG-2 735. A PMIP binding update 790 is send to LMA-2 740. MAG-3 785 sends a PMIP_BU 790 request to LMA-2 740 that includes HoA2 and CoA3. LMA-2 740 keeps track of CoA3. Each time WTRU-2 730 changes its point of attachment, a new binding update is sent from the new MAG to LMA-2 740.

LMA-2 740 sends a PMIP_IUT_PrepReq 792 to MAG-3 785 and receives a PMIP_IUT_PrepAck 794 from MAG-3 785. MAG-3 735 updates its binding table 796 by replacing the destination CoA. LMA-2 740 sends updated information to LMA-1 720. LMA-2 740 sends a PMIP_BU 795 to LMA-1 720. LMA-1 720 updates its binding table 793 with CoA3 information and sends a PMIP_BA acknowledgment 797 to LMA-2 740. Once LMA-1 720 receives information from the CN 705, it is able to send it to the correct MAG as attached. The CN 705 may send additional data 798 to LMA-1 720. LMA-1 720 tunnels data using CoA3 799 to MAG-3 785, since WTRU-2 730 is attached to MAG-3 785, so that data may be directed to MAG-3 785. MAG-3 785 sends data 791 to WTRU-2 730.

At any point in the method of FIGS. 7C and 7D, additional actions may be performed between WTRU-1 710, WTRU-2 730, SC 725, MAG-1 715, MAG-2 735, MAG-3 785, LMA-1 720, LMA-2 740, SC 725 and CN 705.

Figure 8:
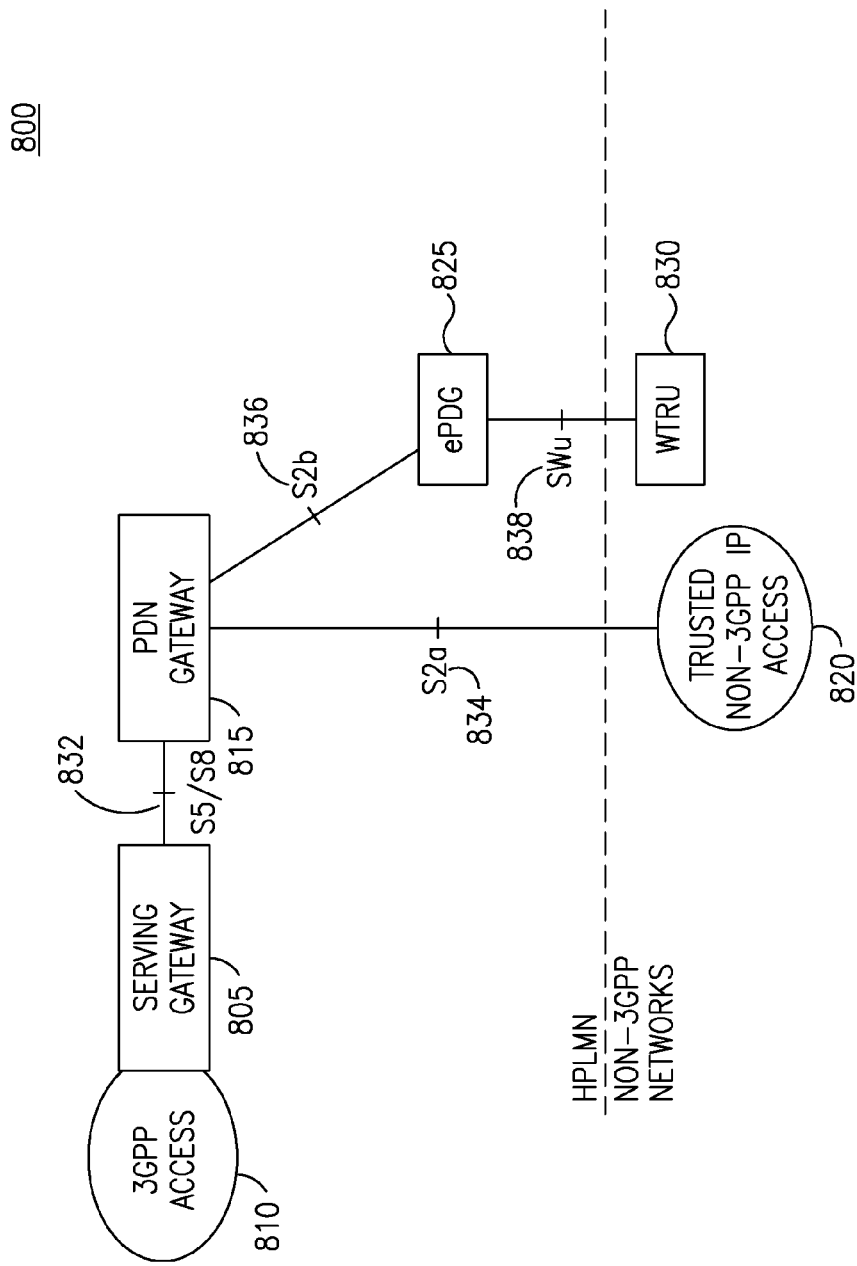
FIG. 8 shows a diagram of a GTP or PMIP protocol used over multiple references points.

FIG. 8 is a block diagram of architecture 800 using either GTP or PMIP depending on the network operator choice of deployment. GTP or PMIP 832 may be used between the Service Gateway 805 in a 3GPP Access Network 810 and the PDN Gateway 815, and GTP or PMIP 836 may be used between the PDN Gateway 815 and the ePDG gateway 825. In addition, PMIP and GTP 832 may also be used between the Service Gateway 805 and the PDN Gateway 815 when the Serving Gateway 805 and the PDN Gateway 815 are in different domains. PMIP 834 may be used between the PDN Gateway 815 and a non third generation partnership project (3GPP) IP access gateway 820. The PDN may act as the GTP anchor, which may be a similar role to the LMA in PMIP. In addition, the ePDG 825 uses similar functionality to the MAG. An IPsec tunnel 838 may be used between the WTRU 830 and the ePDG 825 when connecting through an untrusted non-3GPP access network.

Figure 9:
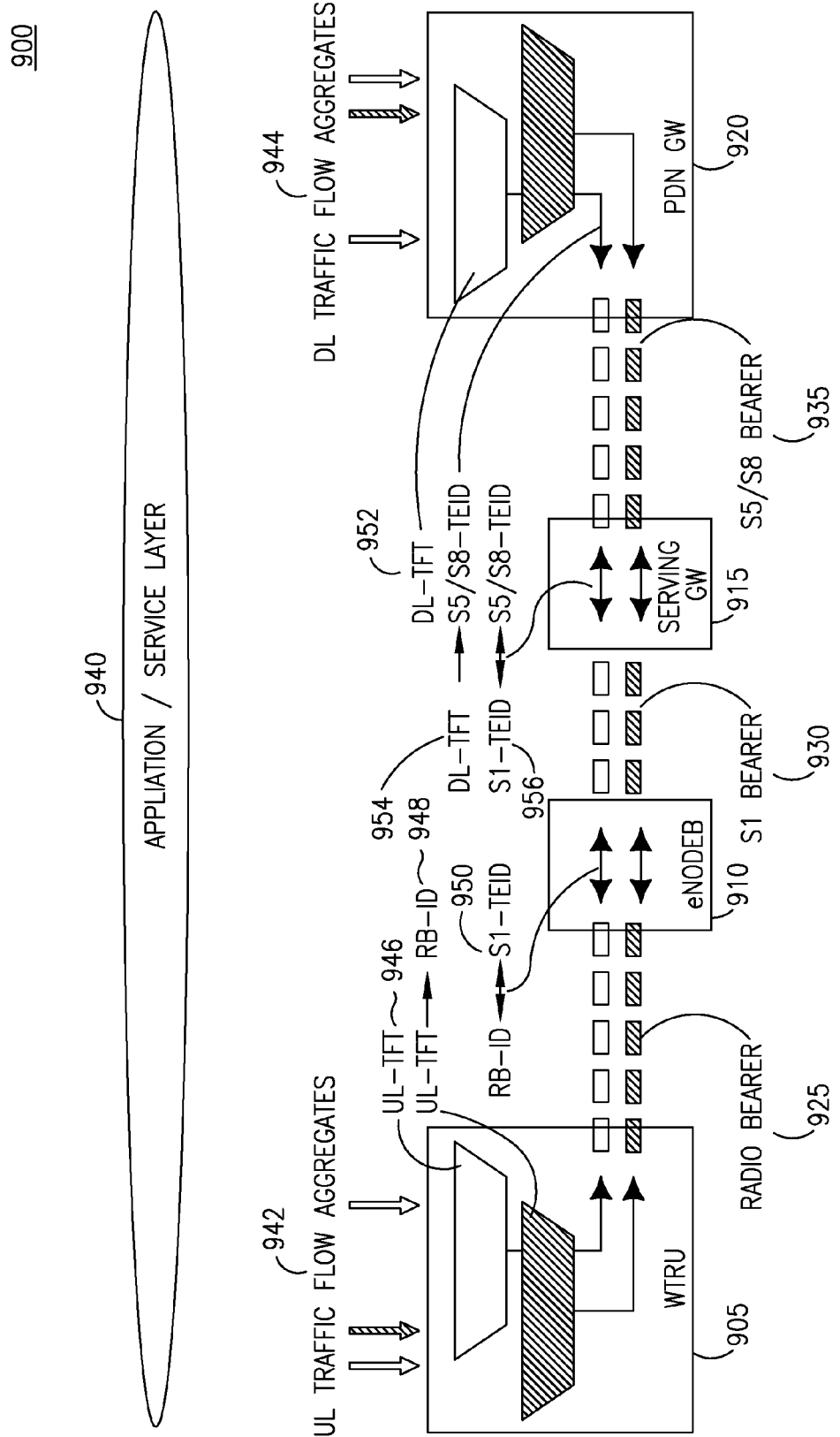
FIG. 9 shows a diagram of EPS bearers when using GTP.

FIG. 9 is a block diagram 900 of unicast evolved packet system (EPS) bearers using GTP. GTP is used in 3GPP to implement network-based IP mobility, which supports connecting a WTRU 905 to one or more PDNs 920 through several access point names (APNs). A WTRU 905 may use several APNs at a given time. The APNs may identify a point of attachment for the WTRU to the PDN 920. Within an APN a WTRU 905 may have server PDN connections. Every PDN connection may be associated with a GTP tunnel, which may be associated with a tunnel endpoint ID of both sides of a tunnel. Every PDN connection may have one or more EPS bearers, where every bearer is associated with uplink and downlink traffic flow filters (TFTs) 946, 948, 952, 954. Both UL and DL traffic flow aggregates 942, 944 are used to communicate with an application/service layer 940.

An EPS bearer uniquely identifies traffic flows that receive a common QoS treatment between a WTRU 905 and a PDN GW 920 for GTP based S5/S8 bearer 935, and between WTRU 905 and Serving GW 915 for PMIP based S5/S8 bearer 935. One EPS bearer is established when the WTRU 905 connects to a PDN 920, and remains established throughout the lifetime of the PDN 920 connection to provide the WTRU 905 with always-on IP connectivity to that PDN 920. That bearer is referred to as the default bearer. Any additional EPS bearer that is established for the same PDN connection is referred to as a dedicated bearer.

An UpLink Traffic Flow Template (UL TFT) 946, 948 is the set of uplink packet filters in a TFT. A DownLink Traffic Flow Template (DL TFT) 952, 954 is the set of downlink packet filters in a TFT. Every dedicated EPS bearer is associated with a TFT. The WTRU 905 uses the UL TFT 946, 948 for mapping traffic to an EPS bearer in the uplink direction. DL TFT 952, 954 is used for mapping traffic to an EPS bearer in the downlink direction. A radio bearer (RB) 925 transports the packets of an EPS bearer between a WTRU 905 and an eNodeB 910. If a radio bearer exists, there is a one-to-one mapping between an EPS bearer and this radio bearer. An S1 bearer 930 transports the packets of an EPS bearer between an eNodeB 910 and a Serving GW 915. An S5/S8 bearer 935 transports the packets of an EPS bearer between a Serving GW 915 and a PDN GW 920.

Figure 10:
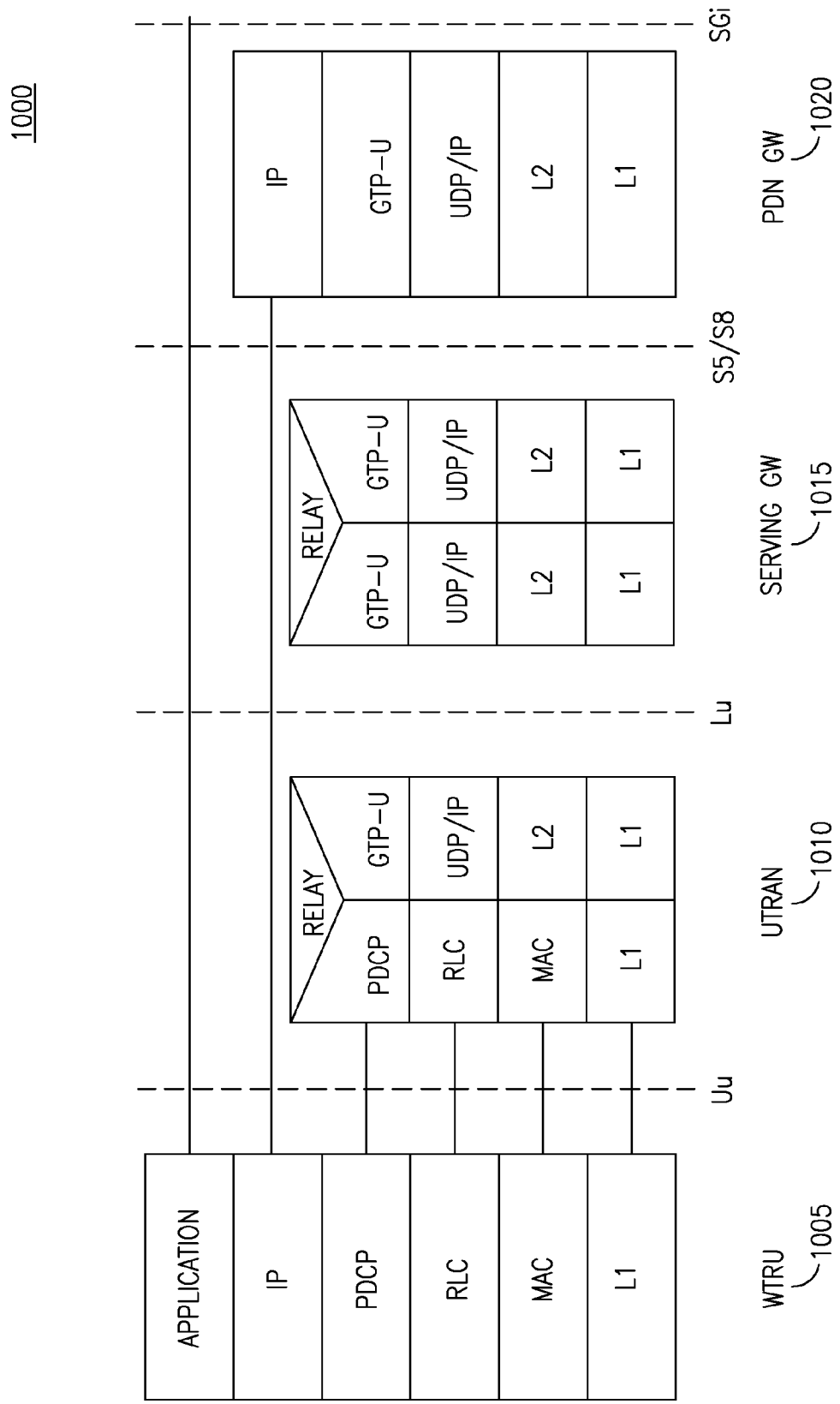
FIG. 10 shows a diagram of user plane reference points.

FIG. 10 is a stack view of user plane reference points 1000 between a WTRU 1005 and a PDN GW 1020. GTP is used as the protocol to tunnel user data between the UTRAN 1010 and the Serving GW 1015 as well as between the Serving GW 1015 and the PDN GW 1020 in the backbone network. GTP may encapsulate all end user IP packets.

Figure 11:
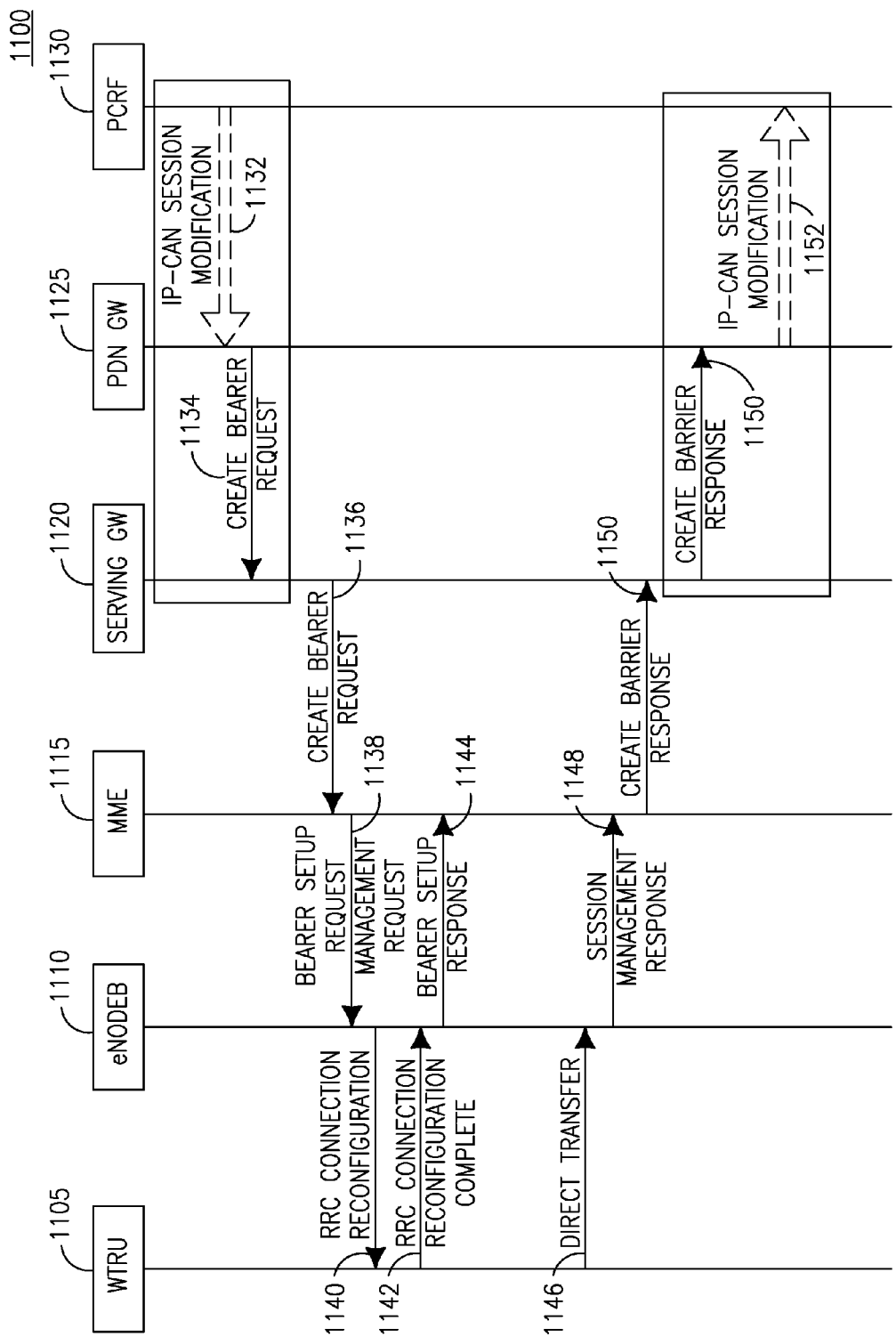
FIG. 11 is a flow diagram of a dedicated bearer activation procedure.

FIG. 11 is a flow diagram of a dedicated bearer activation procedure 1100. A policy charging rules function (PCRF) 1130 initiates an IP-CAN session modification 1132 by sending a request to the PDN GW 1125. The PDN GW 1125 creates a bearer request 1134 and sends the create bearer request 1134 to the mobility management entity (MME) 1115 via the Serving GW 1120. The MME 1115 sends a bearer setup request/session management request 1138 to the eNodeB 1110. The eNodeB 1110 sends a RRC Connection Reconfiguration request 1140 to the WTRU 1105.

Once the reconfiguration is complete, the WTRU 1105 sends a RRC Connection Reconfiguration Complete response 1142 to the eNodeB 1110. The eNodeB 1110 sends a Bearer Setup Response 1144 to the MME 1115. The WTRU 1105 sends a direct transfer request 1146 to the eNodeB 1110 and the eNodeB 1110 sends a Session Management Response 1148 to the MME 1115. The MME 1115 sends a Create Bearer Response 1150 to the PDN GW 1125 via the Serving GW 1120. The PDN GW 1125 sends a IP-CAN Session Modification message 1152 to the PCRF 1130.

At any point in the method of FIG. 11, additional actions may be performed between WTRU 1105, eNodeB 1110, MME 1115, Serving GW 1120, PDN GW 1125 and PCRF 1130.

Figure 12:
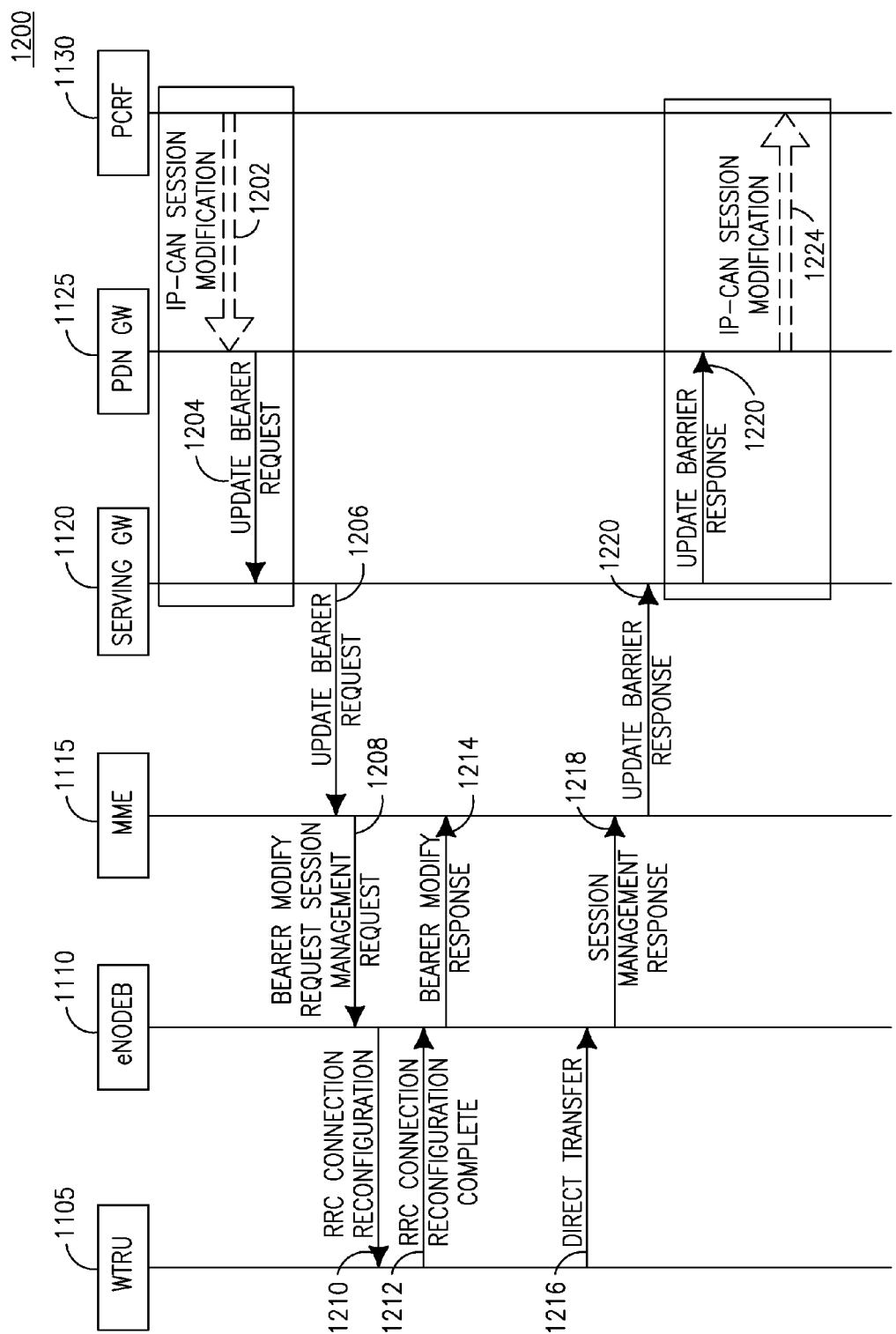
FIG. 12 is a flow diagram of a dedicated bearer modification procedure with a bearer QoS update.

FIG. 12 is a flow diagram of a bearer modification procedure 1200 with a bearer QoS update. A PCRF 1130 initiates an IP-CAN session modification by sending an request 1202 to the PDN GW 1125. The PDN GW 1125 creates an update bearer request 1204 and sends the update bearer request 1204 to the Serving GW 1120. The Serving GW transmits the update bearer request 1206 to the MME 1115. The MME 1115 sends a bearer modify request/session management request 1208 to the eNodeB 1110. The eNodeB 1110 sends a RRC Connection Reconfiguration request 1210 to the WTRU 1105.

Once the reconfiguration is complete, the WTRU 1105 sends a RRC connection reconfiguration complete response 1212 to the eNodeB 1110. The eNodeB 1110 sends a bearer modify response 1214 to the MME 1115. The WTRU 1105 sends a direct transfer request 1216 to the eNodeB 1110 and the eNodeB 1110 sends a session management response 1218 to the MME 1115. The MME 1115 sends a update bearer response 1220 to the PDN GW 1225 via the Serving GW 1120. The PDN GW 1125 sends a IP-CAN session modification message 1224 to the PCRF 1130.

At any point in the method of FIG. 12, additional actions may be performed between WTRU 1105, eNodeB 1110, MME 1115, Serving GW 1120, PDN GW 1125 and PCRF 1130.

Figure 13:
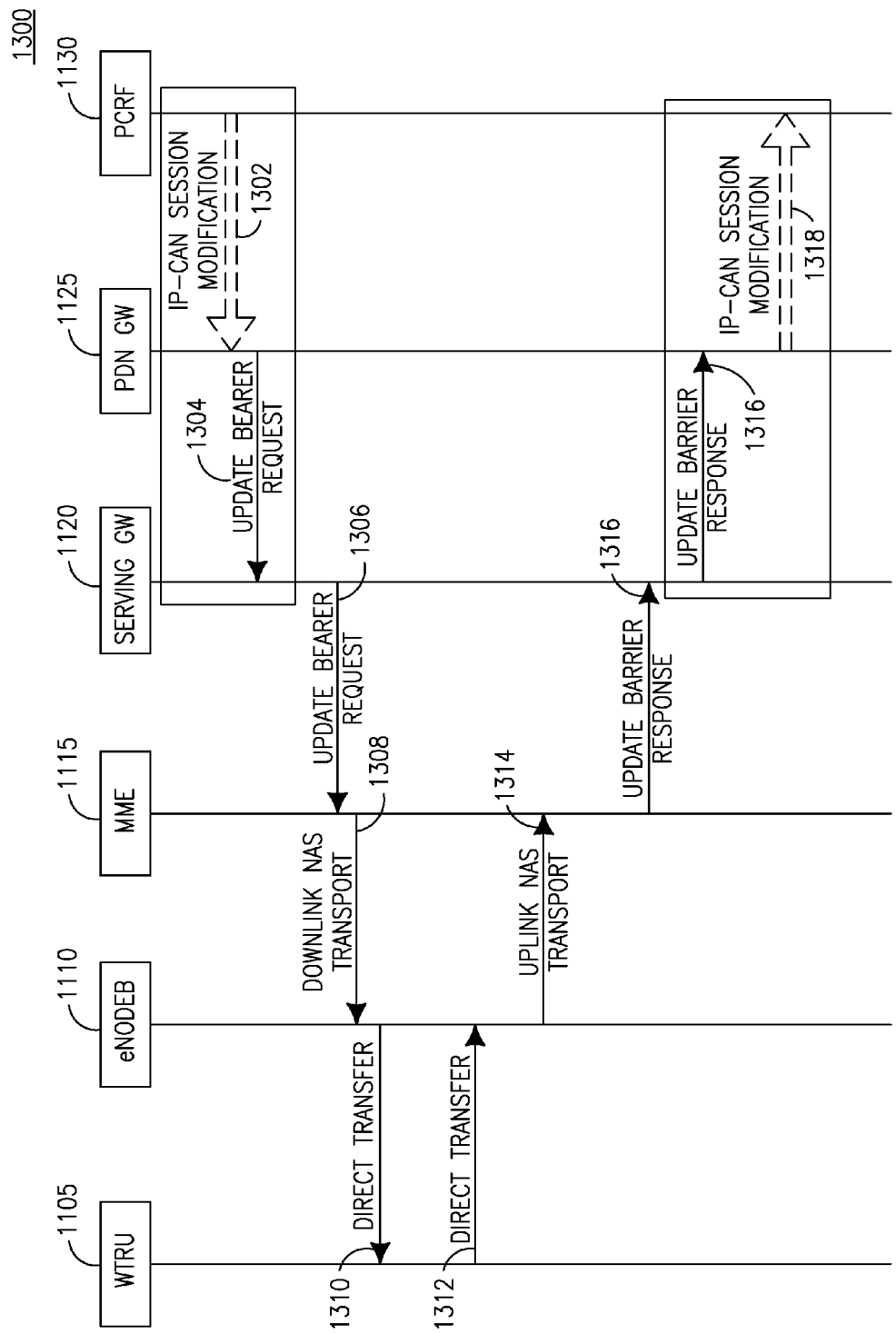
FIG. 13 is a flow diagram of a dedicated bearer modification procedure without a bearer QoS update.

FIG. 13 is a flow diagram of a bearer modification procedure 1300 without a bearer QoS update. A PCRF 1130 initiates an IP-CAN session modification by sending an request 1302 to the PDN GW 1125. The PDN GW 1125 creates an update bearer request 1304 and sends the update bearer request 1304 to the MME 1115 via the Serving GW 1120. The MME 1115 sends a downlink NAS transport request 1308 to the eNodeB 1110. The eNodeB 1110 sends a direct transfer request 1310 to the WTRU 1105.

The WTRU 1105 sends a direct transfer response 1312 to the eNodeB 1110. The eNodeB 1110 sends an uplink NAS transport message 1314 to the MME 1115. The MME 1115 sends a update bearer response 1316 to the PDN GW 1125 via the Serving GW 1120. The PDN GW 1125 sends a IP-CAN session modification message 1318 to the PCRF 1130.

At any point in the method of FIG. 13, additional actions may be performed between WTRU 1105, eNodeB 1110, MME 1115, Serving GW 1120, PDN GW 1125 and PCRF 1130.

Figure 14:
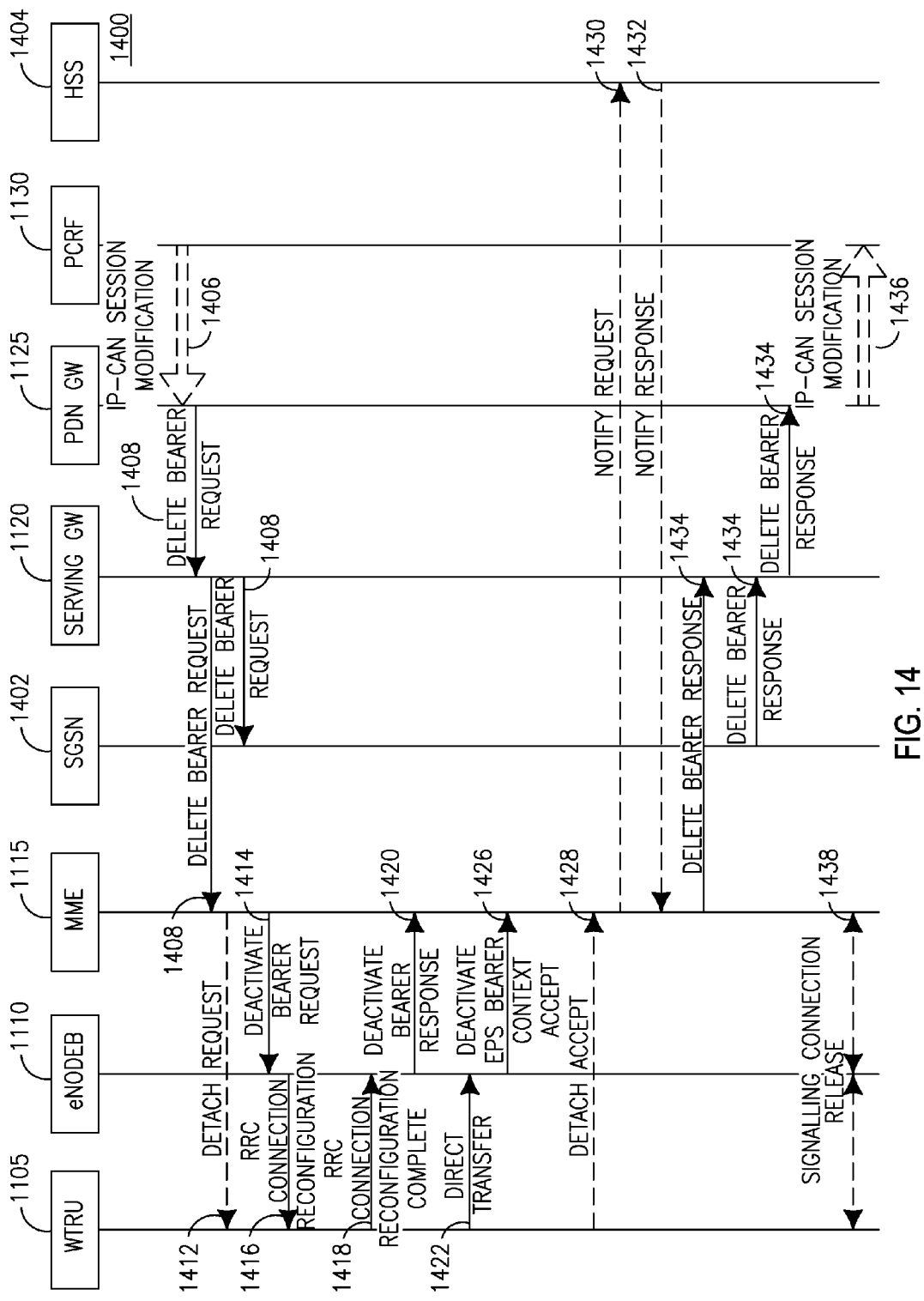
FIG. 14 is a flow diagram of PDN GW initiated bearer deactivation.

FIG. 14 is a flow diagram of a PDN GW initiated bearer deactivation procedure 1400. A PCRF 1130 initiates an IP-CAN session modification by sending an request 1406 to the PDN GW 1125. The PDN GW 1125 creates an delete bearer request 1408 and sends the delete bearer request 1408 to the MME 1115 via the Serving GW 1402. The Serving GW 1420 also sends the delete bearer request 1408 to the SGSN 1402. The MME 1115 sends a detach request 1412 to the WTRU 1105 and a deactivate bearer request 1414 to the eNodeB 1110. The eNodeB 1110 sends a RRC Connection Reconfiguration 1416 request to the WTRU 1105.

Once the reconfiguration is complete, the WTRU 1105 sends a RRC connection reconfiguration complete response 1418 to the eNodeB 1110. The eNodeB 1110 sends a deactivate bearer response 1420 to the MME 1115. The WTRU 1105 sends a direct transfer request 1424 to the eNodeB 1110 and the eNodeB 1110 sends a deactivate EPS bearer context accept response 1426 to the MME 1115. The WTRU 1105 sends a detach accept response 1428 to the MME 1115. The MME 1115 sends a notify request 1430 to the HSS 1404 and receives a notify response 1432 from the HSS 1404. The MME 1115 and the SGSN 1402 both send a delete bearer response 1434 to the Serving GW 1120. The Serving GW 1120 sends a delete bearer response 1434 to the PDN GW 1125. The PDN GW 1125 sends a IP-CAN session modification message 1436 to the PCRF 1130. The WTRU 1104, eNodeB 1110 and MME 1115 perform a signaling connection release 1438.

At any point in the method of FIG. 14, additional actions may be performed between WTRU 1105, eNodeB 1110, MME 1115, SGSN 1402, Serving GW 1120, PDN GW 1125, PCRF 1130 and HSS 1404.

Figure 15:
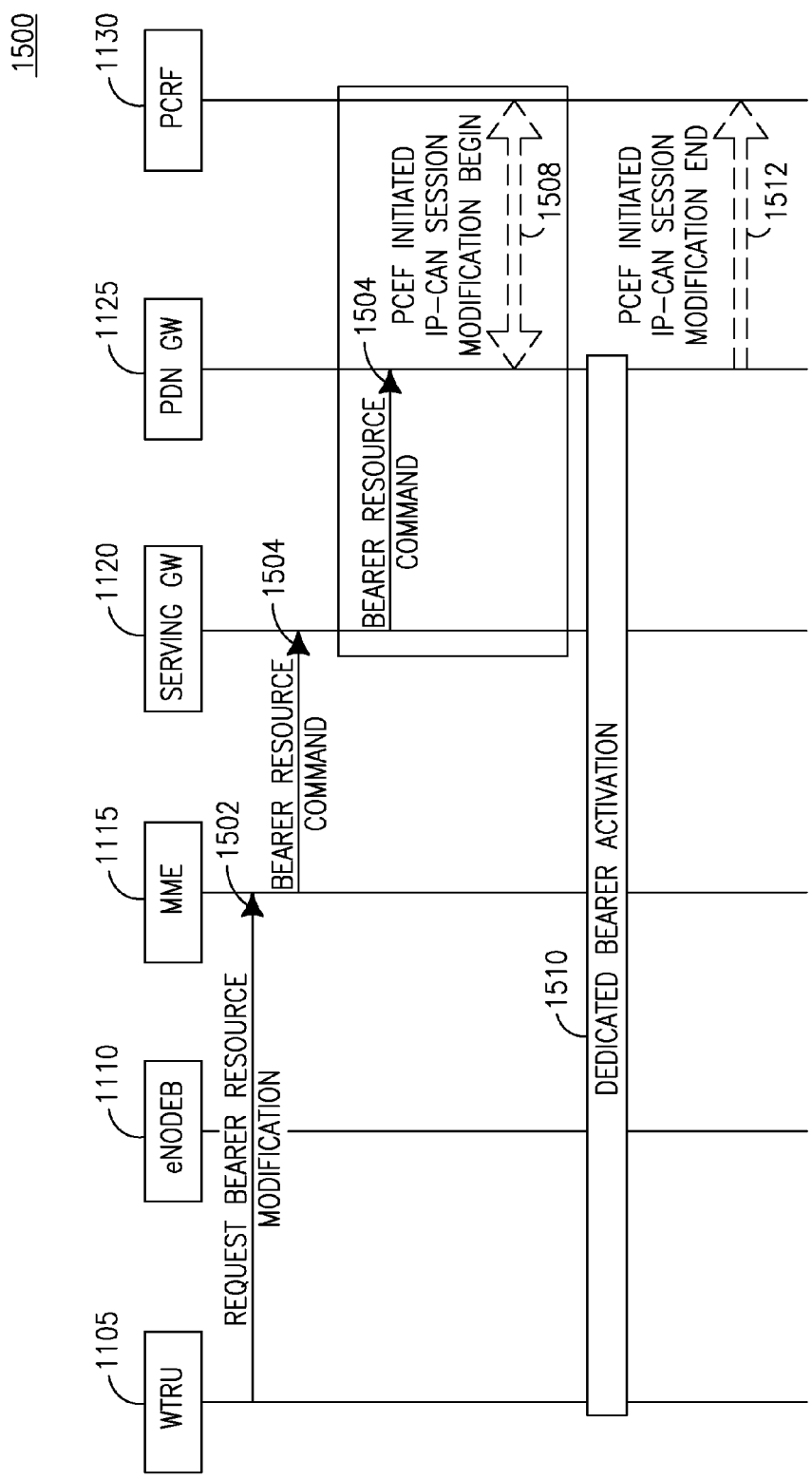
FIG. 15 is a flow diagram of a bearer resource modification procedure.

FIG. 15 is a flow diagram of a WTRU requested bearer modification procedure 1500. A WTRU 1105 requests a bearer resource modification by sending a message 1502 to the MME 1115. The MME 1115 sends a bearer resource command 1504 to the PDN GW 1125 via the Serving GW 1120. A PCRF 1130 initiates an IP-CAN session modification 1508 with the PDN GW 1125. Dedicated bearer activation occurs 1510 between the WTRU 1105, eNodeB 1110, MME 1115, Serving GW 1120 and PDN GW 1125. The PDN GW 1125 sends a IP-CAN session modification message 1512 to the PCRF 1130.

At any point in the method of FIG. 15, additional actions may be performed between WTRU 1105, eNodeB 1110, MME 1115, Serving GW 1120, PDN GW 1125 and PCRF 1130.

Figure 16:
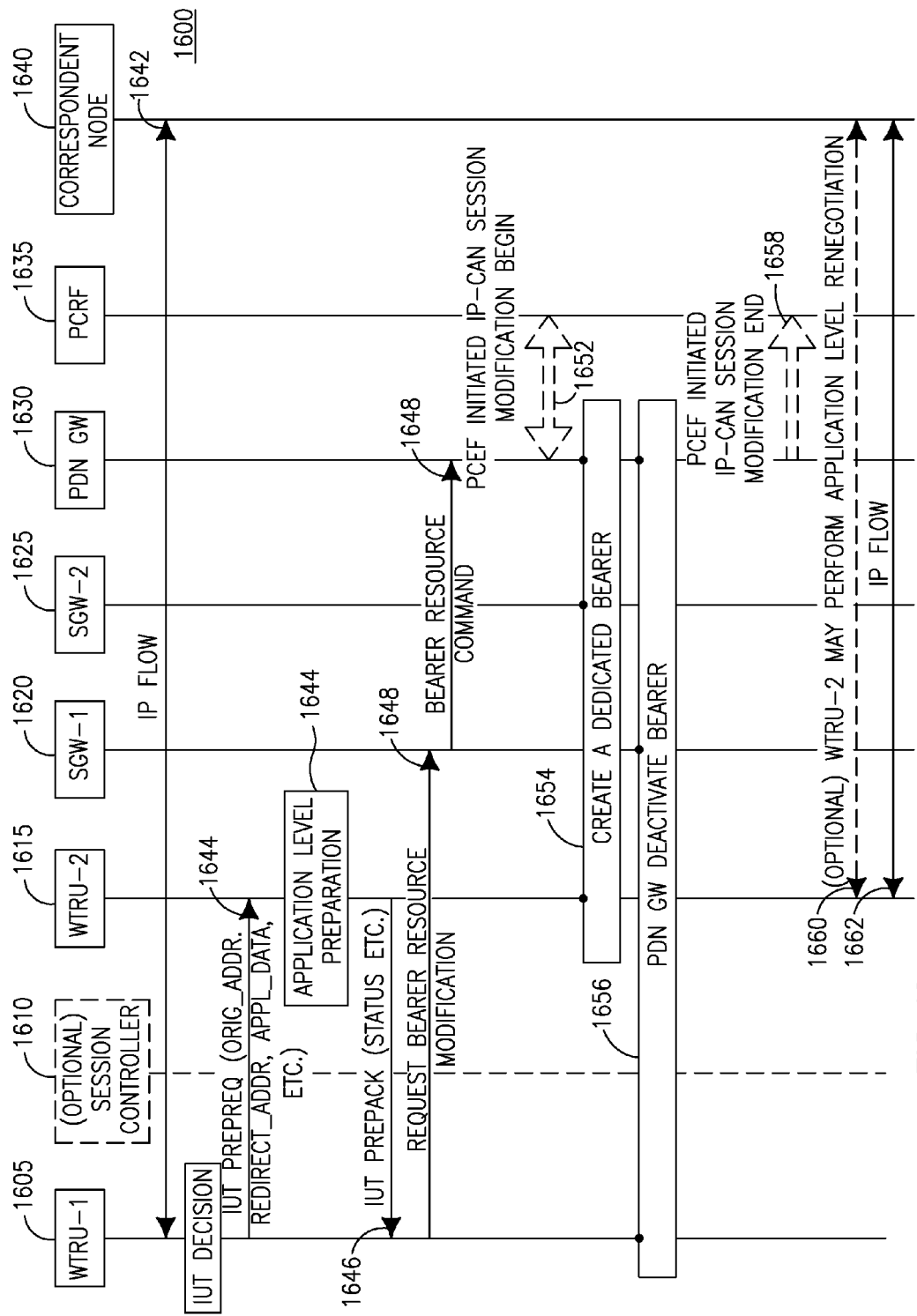
FIG. 16 is a flow diagram of a GTP based IP flow between WTRU-1 and WTRU-2.

FIG. 16 is a flow diagram of an IP flow end point transfer 1600 from one WTRU to another WTRU using GTP. An IP flow 1642 exists between a source WTRU 1605 and a CN 1640. In order to perform selective IUT a source WTRU 1605 determines to perform IUT and notifies the CN 1640. WTRU-1 1605 contacts WTRU-2 1615 by sending an IUT_PrepReq 1644 to WTRU-2 1615. This informs WTRU-2 1615 that an IUT procedure is about to occur. The request may be sent via a SC 1610. WTRU-2 1615 performs application level preparation 1644 and updates its state and IP stack to add WTRU-1s 1605 IP address on a logical interface to be able to receive and send packets from WTRU-1s 1605 IP address. The WTRU-2 1615 sends an IUT_PrepAck 1646 to WTRU-1 1605. The acknowledgment 1646 may be sent via a SC 1610.

WTRU-1 1605 performs a bearer resource modification targeting the EPS bearer currently used to transport the media flow to transfer. Signaling is modified to enable providing an identifier of WTRU-2 1615 to the PDN GW 1630. WTRU-1 1605 may send a bearer resource modification request 1648 to the PDN GW 1630 via the SGW-1 1620. PCEF initiated IP-CAN session modification 1652 may begin between the PDN GW 1630 and the PCRF 1635. The PDN GW 1630 creates a dedicated bearer (e.g., which may follow the procedure described in FIG. 11) or modifies an existing bearer (e.g., which may follow the procedure described in FIG. 12, on a condition that a QoS update is performed or FIG. 13, on a condition that no QoS update is performed during the bearer modification) 1654 between WTRU-2 1615, the PDN GW 1630 and the SGW-2 1625. In an embodiment, the PDN GW may choose to re-use an existing bearer terminated on WTRU-2 1615 to transport the transferred traffic (i.e., a Modifies Existing Bearer procedure may be used), or in another case the PDN GW may choose to use a new bearer for this purpose (i.e., a Create Existing Bearer procedure may be used). On both sides of the new or modified bearer, the TFT in the PDN GW 1630 and WTRU-2 1615 direct the targeted traffic through this bearer. TFT1 may be the TFT related to the transferred flow. TFT1 on the downlink may match traffic with specified flow characteristics with a destination IP, WTRU-1s 1605 IP. The traffic may be directed through the GTP tunnel of the EPS bearer between WTRU-2 1615 and PDN GW 1630. TFT1 on the uplink may match with specified flow characteristics with an IP source, WTRU-1s 1605 IP. The traffic may be directed through the EPS bearer between WTRU-2 1615 and the PDN GW 1630. In addition a PDN GW 1630 deactivate bearer procedure 1656 is executed between WTRU-1 1605, SGW-1 1620 and PDN GW 1630 (i.e., which may follow the deactivate bearer procedure described in FIG. 14). The PDN GW 1630 sends a PCEF 1635 initiated IP-CAN session modification end reply 1658 to the PCRF 1635. WTRU-2 1615 may perform an application level renegotiation 1660 with the CN 1640 and may also establish an IP flow 1662 with the CN 1640. The PDN GW 1630 and WTRU-1 1605 may update their TFT to remove the traffic from WTRU-1 1605 bearer.

At any point in the method of FIG. 16, additional actions may be performed between WTRU-1 1605, WTRU-2 1615, SC 1610, SGW-1 1620, SGW-2 1625, CN 1640, PDN GW 1630 and PCRF 1635.

In an embodiment, an initial request message 1648 may be sent from WTRU-1 1605 to the PDN GW 1630 that includes a new IE. The new IE, for example, IUT Target IP Address, is added to message 1648. The value of this IE is an IP address (i.e., the IP address of WTRU-2 1615, the target of the transfer). Since this IE is present in message 1648, the PDN GW 1630 triggers an IUT Transfer operation to the target identified by the IE, WTRU-2 1615.

A new IE, for example, IUT Source IP Address, may be added in all downlink messages from the PDN GW 1630 to WTRU-2 1615 within the Create a Dedicated Bearer or Modifies an Existing Bearer procedure 1654. In the case where a new bearer is created, messages 1134, 1136, 1138 and 1140 include the new IE, IUT Source IP Address, which may follow the procedure described in FIG. 11.

In the case where an existing bearer is modified, messages 1204, 1206, 1208, 1210 may include the new IE, (i.e., FIG. 12) or 1304, 1306, 1308, 1310 (i.e., FIG. 13).

Figure 17:
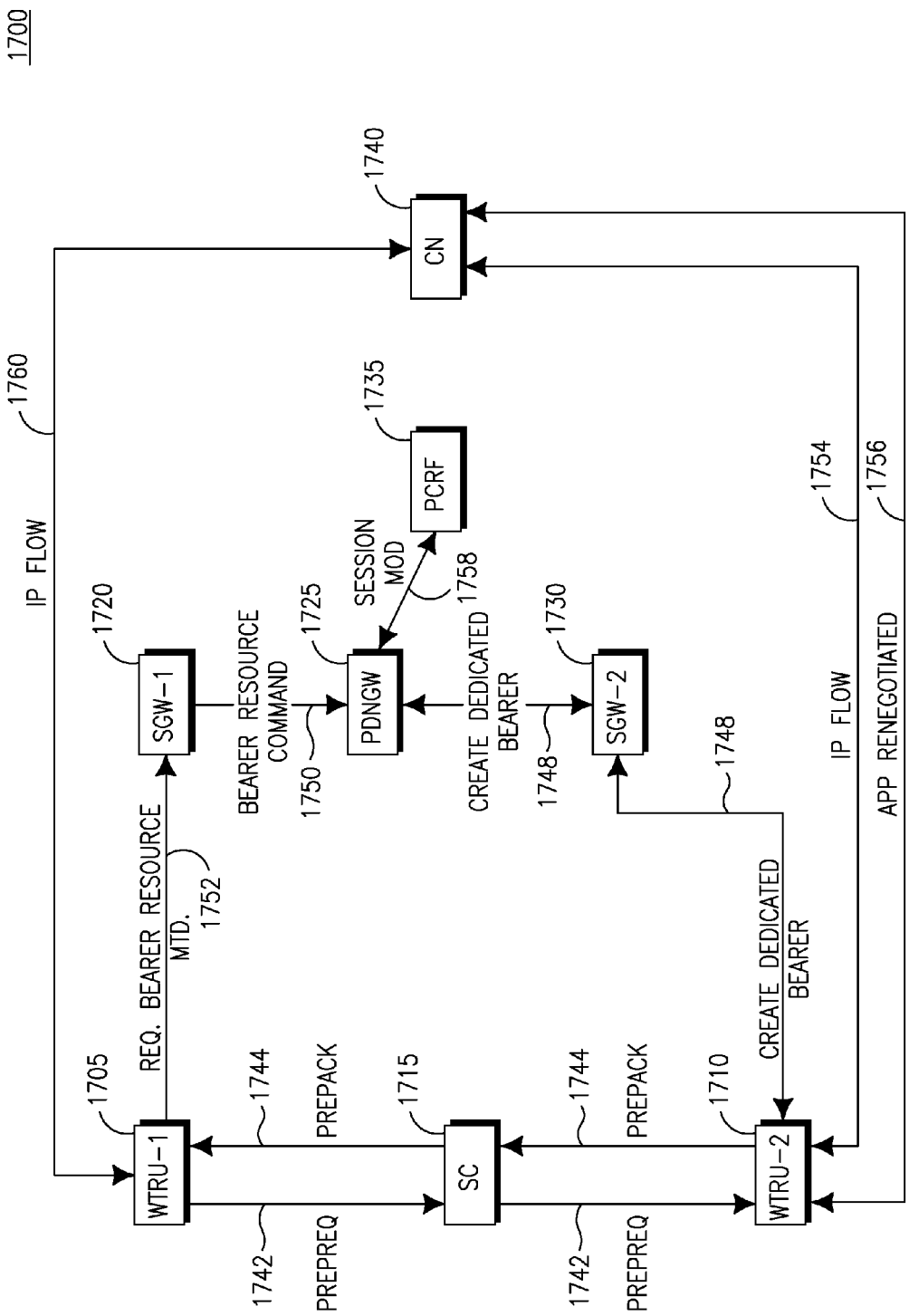
FIG. 17 shows a diagram of media session transfer between WTRU-1 and WTRU-2 where WTRU-1 and WTRU-2 are in communication with PDN GW.

FIG. 17 shows IUT 1700 between a source WTRU 1705 and a target WTRU 1710 that are connected to different SGWs and are registered with the same PDN GW 1725. In this embodiment, the source WTRU, WTRU-1 1705, may create an IP flow 1760 with the CN 1740. WTRU-1 1705 may send a request bearer resource modification 1752 to the SGW-1 1720 and the SGW-1 1720 may send a bearer resource command 1750 to the PDN GW 1725.

WTRU-1 1705 may send an IUT_PrepReq 1742 to WTRU-2 1710 via the SC 1715. WTRU-2 1710 may send a IUT_PrepAck 1744 to WTRU-1 1705 via the SC 1715.

The PDN GW 1725 may create a dedicated bearer between itself and WTRU-2 1748 to WTRU-2 1710 via the SGW-2 1730. The PDN GW 1725 may send a session modification 1758 to the PCRF 1735. WTRU-2 1710 may perform application level negotiation 1756 with the CN 1740 and may begin an IP flow 1754 with the CN 1740.

At any point in the method of FIG. 17, additional actions may be performed between WTRU-1 1705, WTRU-2 1710, SC 1715, SGW-1 1720, SGW-2 1730, PDN GW 1725, PCRF 1735 and CN 1740.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A network node for preparing data flow transfer of a communication session, the network node comprising:
    a local mobility anchor (LMA) configured to:
        transmit an Inter-User Equipment (UE) Transfer (IUT) request to a mobility access gateway (MAG), wherein the IUT request indicates transferring a data flow of the communication session from a source wireless transmit/receive unit (WTRU) to a target WTRU and causes the MAG to update a first binding table upon receiving the IUT requests;
        receive an IUT acknowledgement from the MAG in response to the IUT request; and
        update a second binding table upon receiving the IUT acknowledgement.

2. The network node of claim 1 wherein the IUT request includes at least a home address (HoA) and a care of address (CoA).

3. The network node of claim 1 wherein a proxy mobile IP (PMIP) is used for IUT.

4. The network node of claim 1 wherein a general packet radio service (GPRS) tunneling protocol (GTP) is used for IUT.

5. A method for preparing data flow transfer of a communication session to a target wireless transmit/receive unit (WTRU) from a source WTRU, the method comprising:
    transmitting an Inter-User Equipment (UE) Transfer (IUT) request from a local mobility anchor (LMA) to a mobility access gateway (MAG), wherein the IUT request indicates transferring a data flow of the communication session from the source WTRU to the target WTRU and causes the MAG to update a first binding table upon receiving the IUT request;
    receiving an IUT acknowledgement from the MAG in response to the IUT request; and
    updating a second binding table upon receiving the IUT acknowledgement.

6. The method of claim 5 wherein the IUT request includes at least a home address (HoA) and a care of address (CoA).

7. The method of claim 5 wherein a proxy mobile IP (PMIP) is used for IUT.

8. The method of claim 5 wherein a general packet radio service (GPRS) tunneling protocol (GTP) is used for IUT.

* * * * *